INVENTOR.
MEYER BAR
BY
[signature]
ATTORNEY

INVENTOR.
MEYER BAR
BY Allan Rothenberg
ATTORNEY

Nov. 9, 1965 M. BAR 3,217,295

CORRELATION PATTERN RECOGNITION APPARATUS

Filed Feb. 18, 1963 8 Sheets-Sheet 3

INVENTOR.
MEYER BAR

BY Allan Rothenberg

ATTORNEY

Nov. 9, 1965  M. BAR  3,217,295

CORRELATION PATTERN RECOGNITION APPARATUS

Filed Feb. 18, 1963  8 Sheets-Sheet 4

INVENTOR.
MEYER BAR

BY
Allan Rothenberg

ATTORNEY

INVENTOR.
MEYER BAR
BY
Allan Rothenberg
ATTORNEY

INVENTOR.
MEYER BAR
BY
Allan Rothenberg
ATTORNEY

Nov. 9, 1965　　M. BAR　　3,217,295

CORRELATION PATTERN RECOGNITION APPARATUS

Filed Feb. 18, 1963　　8 Sheets-Sheet 7

INVENTOR.
MEYER BAR

BY
Allan Rothenberg

ATTORNEY

INVENTOR.
MEYER BAR
BY Allan Rothenberg
ATTORNEY

United States Patent Office 3,217,295
Patented Nov. 9, 1965

3,217,295
CORRELATION PATTERN RECOGNITION APPARATUS

Meyer Bar, Palos Verdes Peninsula, Calif., assignor to North American Aviation, Inc.
Filed Feb. 18, 1963, Ser. No. 258,979
18 Claims. (Cl. 340—146.3)

This invention relates to methods and apparatus for recognition of patterns and more particularly concerns the recognition of patterns of selected classes from amongst a group of patterns of different classes.

The extensively recognized need for automatic document reading machines is greatly emphasized by recent progress in the use and complexity of computing machines. The advance of computer technology is such that the interface between printed documents and those suitable for computer input constitutes a principal obstacle in many computer operations. Intensive and widespread effort has been devoted to this subject with some success achieved in the construction of machines for converting printed documents into computer inputs. However, presently known machines that operate successfully require carefully controlled inputs. In accordance with the requirements of some of these document readers the document type style must be of a specified design, often quite different from the conventional type and awkward to prepare and read by human operator.

A variable type font document reader, one that can read types of many styles, is still in the development stage but is generally regarded as a large scale computer operating on inputs from a scanner that reduces the document to a series of black and white dots. The magnitude of the processing involved and the size of the computer required for such variable type reader make for highly undesirable complexities and difficulties in this approach to the problem.

Accordingly, it is an object of this invention to provide a pattern recognizing machine and method that do not require highly stylized types of font nor a great amount of data processing. The present invention employs principles of cross-correlation that are discussed, for example, in Patent No. 2,787,188, for Optical Cross-Correlation. In the concept of cross-correlation between a pair of two dimensional functions, one of the functions may be represented as a printed document for example which ideally has a value of zero except where there is a printed character, at which point the function has a value of one. The other function, a mask, for example, represents a given pattern or character such as the letter X from the type font in which the document is printed. This function has a value that is everywhere one except where the X is located. At such point the mask has a value of zero. In other words one of the functions is optically positive and the other optically negative. The document includes the printed portion in the form of a group of patterns each comprising one of a number of selected classes such as the class of all A's, the class of all B's, the class of all C's, etc. The cross-correlation between two matching patterns will have a maximum of intensity deviation substantially alined with the path of light transmitted between the two functions. For non-matching patterns he intensity deviation is considerably less than such maximum so that the latter is readily discernable.

In carrying out the principles of the invention in accordance with a preferred embodiment thereof light is transmitted between the illuminated patterns of a group of pattenrs that is to be read and a mask that matches a selected class of patterns of the group. For example, a mask is employed having a transparent "A" in the midst of a completely opaque area. The document to be read may be everywhere transparent except where the patterns of the group are formed thereon. The A pattern of the mask negative matches each A of the class of all A's of the document positive. Transmission of light between the illuminated patterns and mask will form a set of cross-correlation maxima having a distribution that corresponds to the spatial arrangement of patterns of the selected class. That is, the maxima so formed have a distribution in space or in time that corresponds to the particular position of the patterns of the group that match the mask pattern. Each pattern of the class, that is, each A of the group that matches the A of the mask will provide a cross-correlation maximum appearing at the focal plane of a lens system that collects light transmitted between the patterns and the mask. Optically, each maximum appears as a relatively small spot or dot having a readily distinguishable intensity deviation. Thus, where the mask and the document are positive and negative or negative and positive respectively, the cross-correlation maximum will appear as a black dot. Where mask and pattern are both optically positive or both optically negative the cross-correlation maximum will appear as a point of maximum light intensity. If there be more than one pattern in the group that matches the selected class of patterns each such pattern coacts with the mask to form similar cross-correlation maxima. Thus, a set of cross-correlation maxima is formed with the maxima having a two dimensional spatial distribution on the focal plane of a lens system that exactly corresponds to the two dimensional spatial distribution of all of the patterns of the selected class on the document. Photosensitive apparatus is provided at the focal plane to produce electrical indications of sets of maxima.

For the recognition of a number of different classes of patterns such as recognition of all the letters of a given alphabet there will be provided a mask unique for each class of patterns to be selected. Without departing from the principles of this invention the masks may be employed either in sequence or simultaneously, requiring but a variation in electronic processing circuitry. Where a plurality of masks are used, each individually matching a selected class of patterns of a group, a number of sets of cross-correlation maxima are formed. One set of such maxima is formed for each mask and the patterns of each matching class. Each set corresponds to a single class of patterns and each maximum corresponds to a single pattern of such class. Again, the maxima of each set have a distribution whether spatial or chronological that corresponds to the physical position of the patterns within the group.

Where plural masks are used, the method and apparatus of the invention provides for an indication of each maxima, its corresponding class, and the position of its corresponding pattern within the group of patterns that is being read. Thus, each cross-correlation maximum or black dot is encoded, as in a binary code for example, with the identity of the class to which its corresponding pattern belongs, so that it may be recognized as an A, B, or C for example. Each cross-correlation maximum is further encoded with the position of the pattern to which it corresponds. These coded signals may then be stored in a suitable storage media such as magnetic tape for use as an input to a computer as may be needed.

The sensor portion of applicant's invention, that which provides an electrical indication of sets of cross-correlation maxima, may be employed in a system wherein a decision group selection takes place to distinguish one class of patterns from one or more other classes that have a degree of similarity unresolvable by the sensor. In addition to the decision group selection there is employed encoding circuitry that, togther with the decision group selection, is under the control of a logic control governing the operation of the decision group selection and the encoding. The principles of the invention are applicable to patterns of any shape or letters of any font, including foreign language alphabets, since the invention is easily adaptable therefor simply by the provision of a different set of masks and change in the control logic.

Thus, it will be seen that objects of this invention include the collective recognition of a number of selected patterns, the class by class recognition of all of the patterns of all of the classes in any particular group, the rapid transposition of printed or other two dimensional information into electrical form, the reading of documents at high speeds, the reading of documents of varying types of fonts, the recognition of different types of fonts and different alphabets, and the recognition of different types of patterns.

These and other objects and many of the attendant advantages of the invention will become more apparent when taken in connection with the following detailed description and the accompanying drawings wherein:

FIG. 1 schematically depicts an exemplary sensor portion of the system of the invention;

FIG. 2 comprises a functional block diagram of a system incorporating the principles of the invention;

FIGS. 3*a*, 3*b* and 3*c* collectively illustrate details of one form of the invention embodying serial reading of masks;

Throughout the drawings like reference characters refer to like parts.

Figure 1:
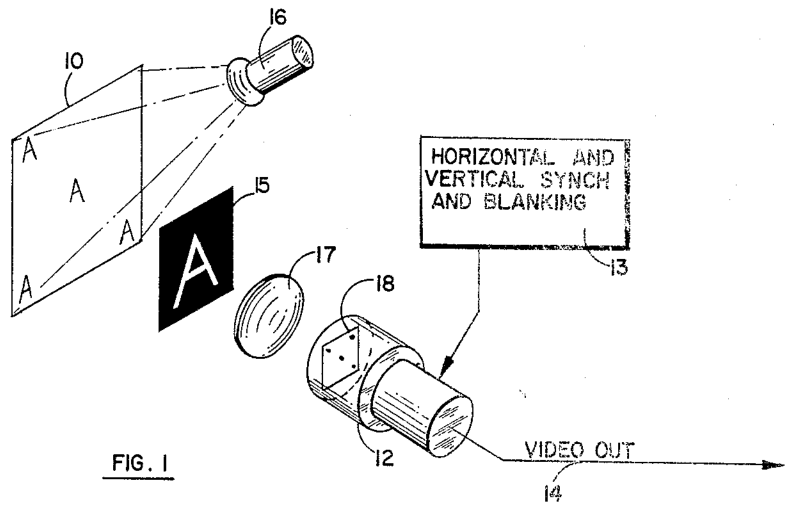

As illustrated in FIG. 1 a document indicated at 10 is to be read in accordance with the principles of this invention. It is to be understood that the invention is applicable to patterns of different types such as the reading of finger prints or the matching of map portions or the like. However, for purposes of exposition the invention is described herein as employed for the reading of letters of a printed document. Such document, having writing over a substantial portion of its surface, will include a group of patterns, each of one of a number of classes, each pattern comprising an individual letter and each class comprising a type of letter. Thus, there is illustrated in FIG. 1 a document positive having printed thereon a number of patterns all of a single class. That is, there are four letters illustrated in the figure and each is of the class of A's. It is to be understood that the document will incorporate a number of other letters or patterns of other classes not illustrated in FIG. 1. Only A's on the exemplary document are illustrated.

For reading of the document and receiving the cross-correlation maxima that are formed there is provided a conventional television type camera or image orthicon 12 having horizontal and vertical synchronization and blanking circuitry 13 operating to provide a video readout on line 14 of information temporarily stored on the screen of the image orthicon 12. For forming cross-correlation maxima of the patterns of the class of A's there is interposed between the image orthicon 12 and the document 10 a negative "A" mask 15 having a generally opaque area with a translucent portion thereof shaped in a pattern A that substantially matches the patterns of the selected class of A's. The document 10 is illuminated by a source of light 16 so that light is transmitted between the document and the mask, being reflected to and through the latter, and collected by a lens system 17 to impinge upon the optical to electrical transducer, the screen of the image orthicon 12, of which the sensitive elements are located in the focal plane of the optical system 17.

It can be shown that the cross-correlation function, that is, each correlation of the negative mask pattern with a matching positive pattern on the document, will produce a correlation value that has a distinctly peaked maximum value at the center of the correlation function. In the arrangement of a positive and negative function, the maximum is a peak of negative intensity, namely, a substantially black and easily discernible dot. For each and every cross-correlation of the mask pattern and a matching pattern of the group of patterns on the document there is similarly formed on the image orthicon sensing screen at the focal plane of the lens system an additional cross-correlation maximum in the form of an intensity illumination minimum. The intensity minima cross-correlation maxima are indicated at 18.

With the arrangement illustrated in FIG. 1, the video output of the image orthicon 12 embodies a series of pulses each corresponding to the point on the orthicon screen at which is located one of the cross-correlation maxima. Accordingly, the chronological position of such pulses in the video output of the image orthicon as related to the horizontal and vertical scanning thereof comprises a pulse distribution corresponding to the physical position or spatial arrangement of all A patterns on the document.

For reading other classes of patterns such as the other letters of a given font there will be provided a mask similar to mask 15 but matching a different class of patterns, one such mask being provided for each character or class to be read. Thus, all of the characters of the document can be located and identified. Locating and identifying circuitry will be described in connection with apparatus more particularly described hereinafter.

It will be noted that for any given font, two or more classes such as C and O may be substantially similar. For example, when using the transparent or negative C mask to read all patterns of the C class, patterns of the class D and patterns of the class O will provide cross-correlation functions in the form of points of diminished illumination of the sensitive elements of the image orthicon. It may be difficult to distinguish such functions from the maxima of cross-correlation of the patterns of C class in view of limitations of the equipment and electronic circuitry associated therewith. Thus, when reading the patterns of the C class for instance there may be provided an indication not only of all C's but of all D's and of all O's for an exemplary font. Accordingly, it will be necessary to subsequently read all D's and all O's and eliminate the cross-correlation maxima obtained with D and O masks from the set of maxima obtained from the C mask. Such an arrangement is herein designated as decision grouping. For an exemplary font of 26 letters Table I below sets forth a decision grouping required with capital letters of font type 17 and electrical processing circuit of the type to be described herein. In this table a bar over a given character indicates that the cross-correlation maxima obtained by utilizing its matching mask are to be eliminated from the sets of cross-correlation maxima obtained from utilizing the mask of the selected character. Thus, $\overline{B}$ and $\overline{R}$ maxima must be eliminated from the set of maxima obtained by utilization of the selected E mask.

*Table I*

| Character: | Decision group |
|---|---|
| A | A |
| B | B |
| C | C, $\overline{D}\,\overline{O}$ |
| D | D |
| E | E, $\overline{B}\,\overline{R}$ |
| F | F, $\overline{P}\,\overline{E}$ |
| G | G |
| H | H |
| I | I, $\overline{F}\,\overline{H}\,\overline{J}\,\overline{K}\,\overline{L}\,\overline{M}\,\overline{N}\,\overline{T}$ |
| J | J, $\overline{U}$ |
| K | K |
| L | L, $\overline{B}\,\overline{D}\,\overline{E}$ |
| M | M |
| N | N |
| O | O, $\overline{G}\,\overline{Q}$ |
| P | P, $\overline{B}\,\overline{R}$ |
| Q | Q |
| R | R |
| S | S |
| T | T, $\overline{L}\,\overline{P}$ |
| U | U |
| V | V, $\overline{M}$ |
| W | W |
| X | X |
| Y | Y, $\overline{W}$ |
| Z | Z |

The decision group for other classes of patterns of for other fonts can be determined empirically and is governed in part by the sensitivity of the available equipment. Thus, it will be readily appreciated that varying intensities of cross-correlation values will be obtained over the entire area of a document to be read with the mask of any given pattern. Nevertheless, it is found that the maxima obtained from reasonably sized decision groups such as those set forth in Table I above will enable the ready recognition and mutual distinction of the classes of patterns of the table. Thus, the information obtained by combining all of the information contained in the maxima of a complete decision group may be utilized to locate and identify individual classes of patterns. The decision group may be defined as the minimum group of masks that will permit identification of a given pattern or class of patterns without ambiguity. The first mask of the group corresponds to the character sought and the maxima obtained therewith indicates the presence of the pattern in the document. The remainder of the masks in a decision group serve in effect to filter out indications of patterns other than the one sought.

Figure 2:
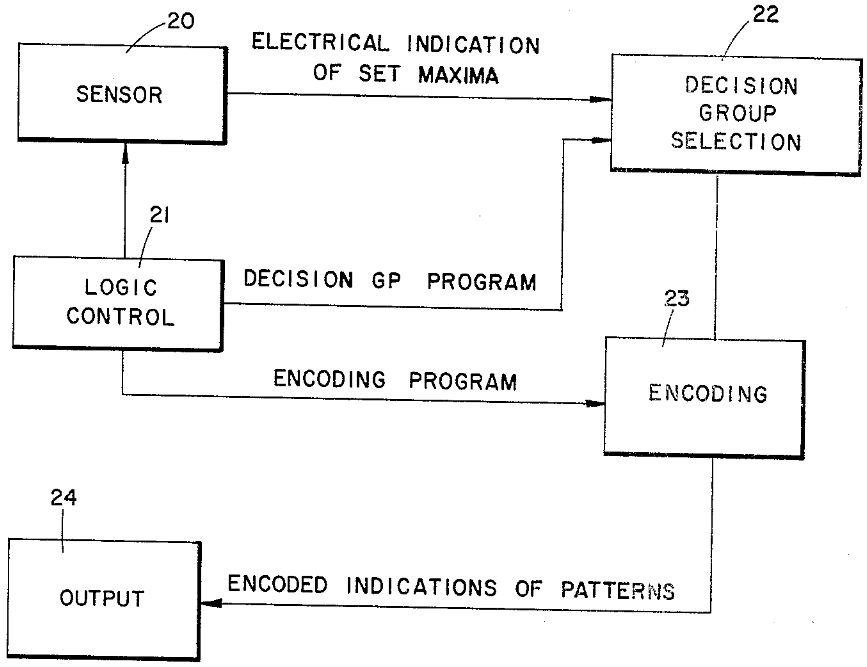

Illustrated in FIG. 2 is a functional diagram of a system embodying the sensor of FIG. 1 and arranged to provide a binary coded output representing recognized patterns, their identity and location within the document being read. There is provided a sensor 20 of the type illustrated in FIG. 1 having masks thereof and the pages of a document changed in accordance with a logic control network 21. As indicated in connection with FIG. 1 the output of the sensor comprises an electrical indication of sets of maxima. The electrical indication may be in the form of a series of pulses each of which represents a given maximum and is time spaced in accordance with the spatial arrangement or position of the specific pattern corresponding to such maxima on the document being read.

Ambiguous indications exist in certain sets of maxima. Ambiguous indications of a set of maxima are defined herein as those which must be eliminated from the set in order to clearly identify a pattern. To eliminate such ambiguities there is provided a decision group selection circuitry 22 that receives all of the electrical indications of the maxima of sets within a decision group such as is identified in Table I. Under control of a program from the logic control network 21 circuits 22 operate to make the necessary decision group choice, subtractively combining indications of sets within a decision group to eliminate the ambiguous maxima. The indications of the selected maxima provided by the output of decision group selection 22 are fed to an encoding circuit 23, also under control of an encoding program command obtained from the logic control network 21, wherein each maximum is identified according to the class of patterns to which it belongs, namely the class of patterns matching the mask that provided such maximum. Each maximum is further identified or encoded with the position of its corresponding pattern on the document. The encoded indications provided at the output of circuit 23 are discrete electrical signals corresponding to the patterns read and have the pattern class and pattern position encoded thereon. These signals are then fed to an output device 24 such as for example a multi-channel magnetic tape in which the contents of the document read may be stored in digital form suitable for rapid input to a computer as may be necessary or desirable.

Figure 3A:
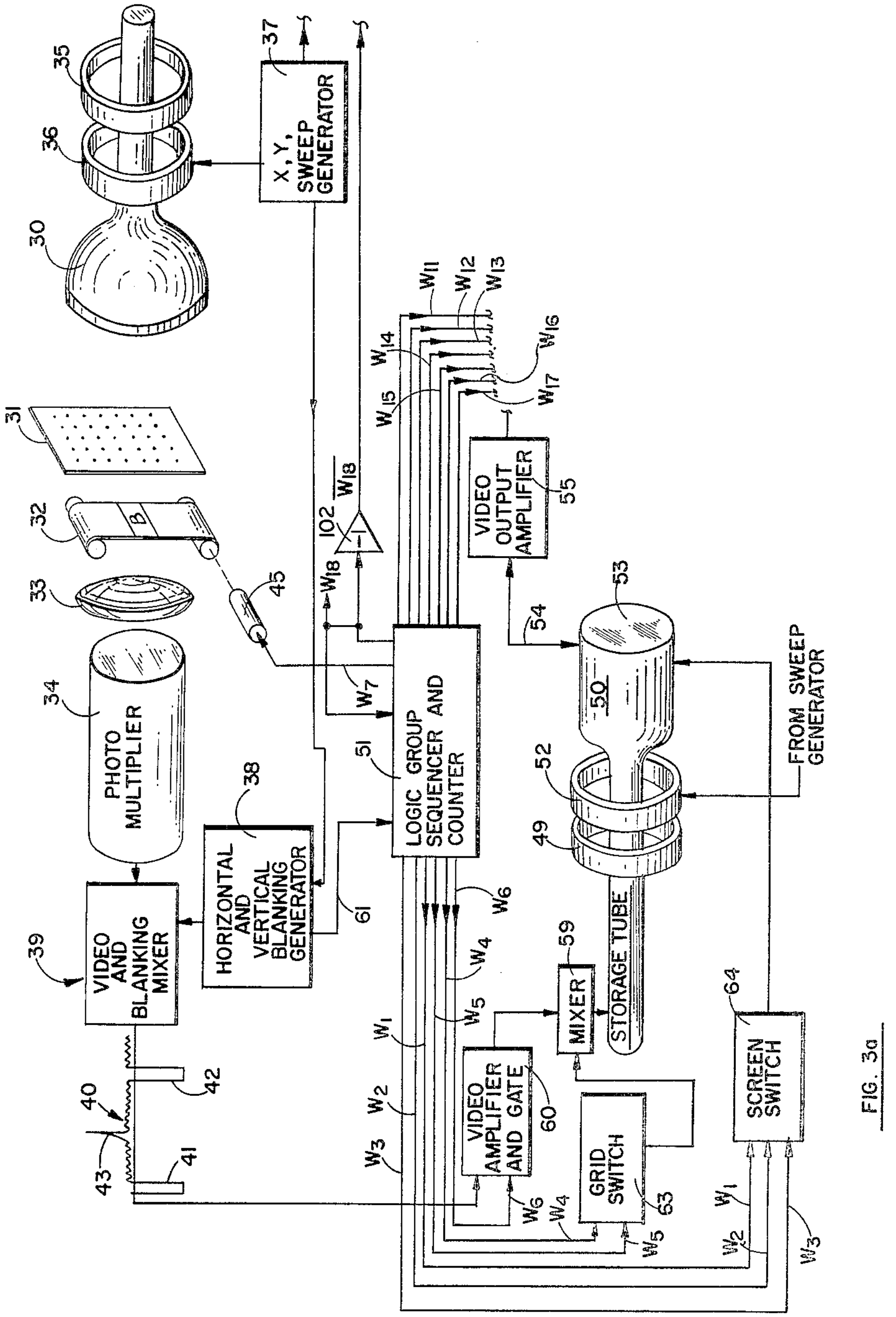
Figure 3B:
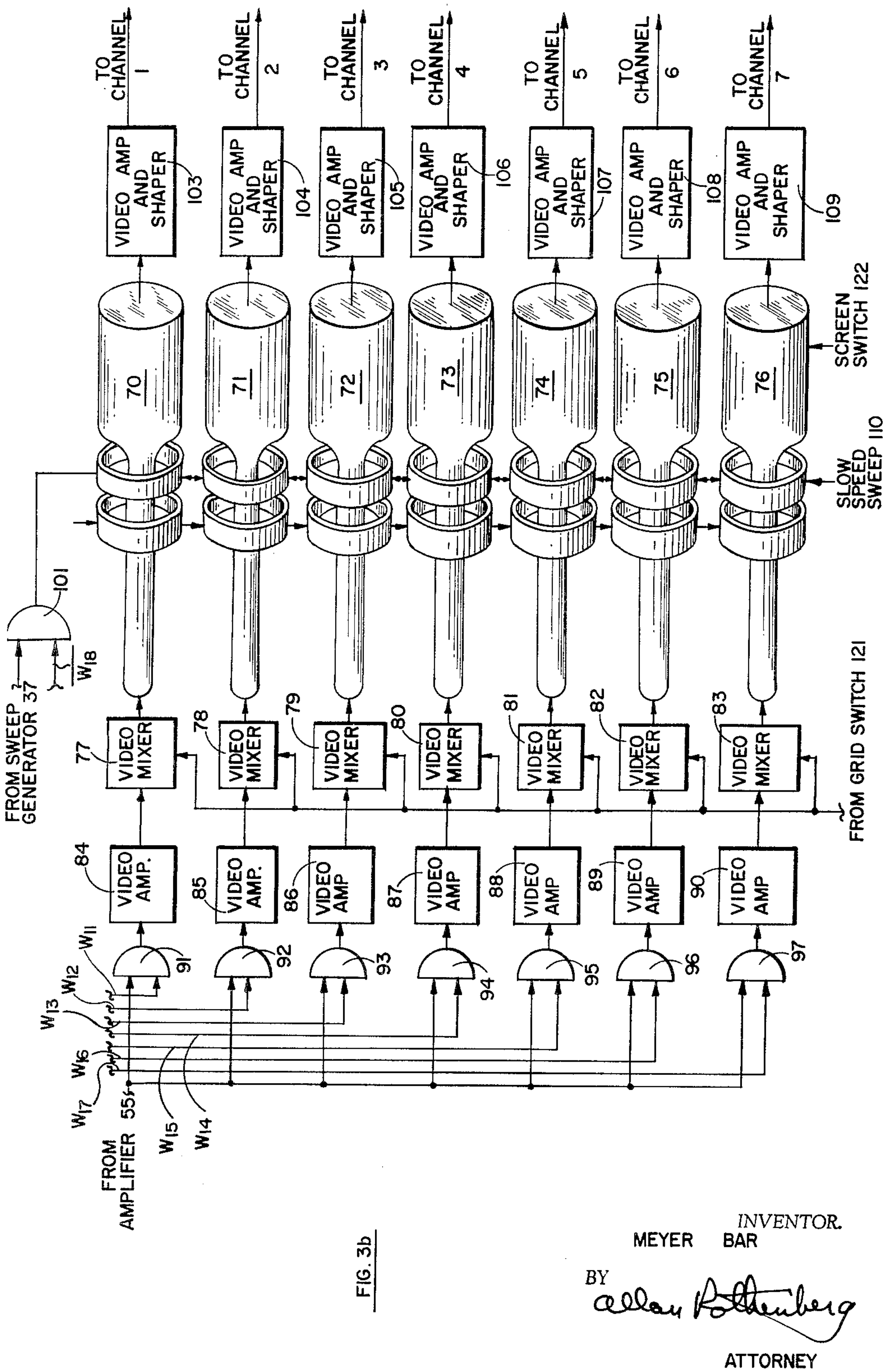
Figure 3C:
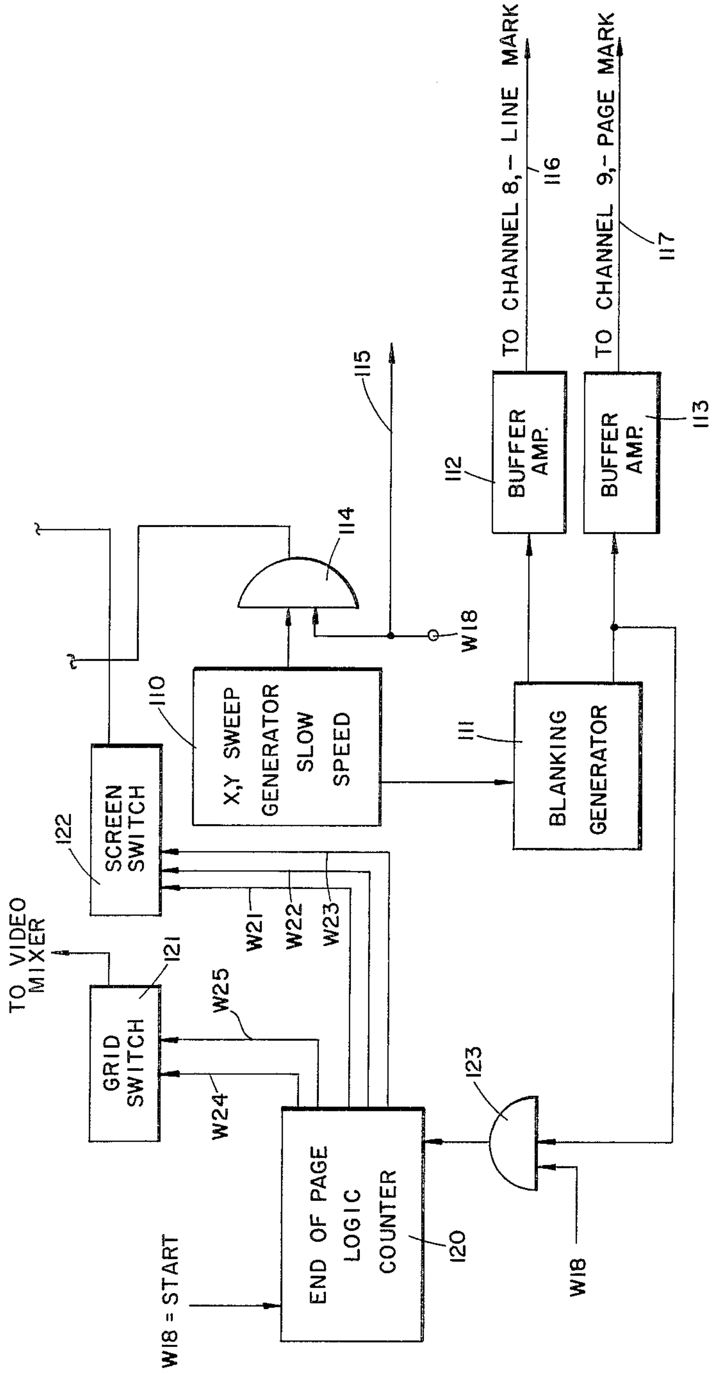

Illustrated in FIGS. 3*a*, 3*b* and 3*c* are details of a system functionally similar to that illustrated in FIG. 2. In this embodiment the sensor includes a conventional flying spot scanner 30 as the source of illumination. A document 31, a mask 32, a lens system 33, and a photomultiplier tube 34 are arranged so that light from the moving beam of the flying spot scanner is transmitted through the document and mask, of which one is a positive and the other negative, and through the lens for reception by the photomultiplier tube. The flying spot scanner includes a focus coil 35 under control of conventional circuitry (not shown) and a deflection coil 36 under control of an X and Y sweep generator 37 that also feeds a trigger signal to a horizontal and vertical blanking pulse generator 38. A video and blanking mixer 39 is provided to superimpose horizontal and vertical blanking pulses from generator 38 upon the output of the photomultiplier tube so that the mixer output will include line and frame markers corresponding to the flying spot scanner horizontal and vertical sweeps.

In a particular embodiment there has been employed a one hundred thirty five millimeter lens spaced approximately one half inch from the mask, the latter being spaced two to two and one half feet from a conventional eight and one half by eleven inch document imprinted with a font type 17. The size of the letter in the mask and that on the document are made the same in this instance so that light rays transmitted between the two are substantially parallel. With this arrangement the photomultiplier is placed in the focal plane of the lens although it will be readily appreciated that if mutually different sizes of mask pattern and document pattern are employed the rays of light collected by the lens will be behind or in front of the lens focal plane whereby the photomultiplier sensitive elements must be appropriately placed. For example, if a document pattern is larger than that of the mask the photomultiplier sensitive element is placed in front of the focal plane of the lens, and vice versa. It is found convenient to employ mask and document patterns of the same size so as to permit fixing all of the optical elements, relative to one another in the axial direction.

As is well known, the flying spot scanner provides a number of successively vertically displaced horizontally scanning narrow beams of light that sweep across the patterns printed upon the document 31 whereby light from the scanning beam is transmitted through the document and thence through the mask to be collected by the lens 33 for reception by the photomultiplier tube 34. The latter provides a serial output via the video and blanking mixer 39 in a form such as that illustrated at 40 wherein relatively negative pulses 41 and 42 are horizontal blanking pulses indicating the beginning and end of a given horizontal document line and scanner sweep and the positive pulse 43 indicates the presence, in this example, of a single cross-correlation maximum for the particular mask and the particular line shown between blanking pulses 41 and 42. It will be readily appreciated that the vertical blanking pulses indicating the end of a complete vertical sweep and the end of a complete document page will be provided via mixer 39 in a form distinguishable from the line pulses 41 and 42, as by wider and deeper pulses (not shown).

The masks utilized for a particular font in the embodiment of FIG. 3 and sequentially employed to provide their respective sets of cross-correlation maxima are all mounted upon an elongated mask strip that is rolled and unrolled at its respective ends under the control of a step motor 45, itself operated by signals on a line $W_7$ as will be described below. The characters of the mask or the particular patterns thereof are provided according to each decision group. The particular order of letters as related to the order of letters in a given alphabet is a matter of choice. However, for any decision group, such as the group involving C, $\overline{D}$ and $\overline{O}$ it is significant for the logic arrangement described herein that the C mask be followed immediately by the D mask and O mask. Thus, for the decision grouping in Table I a convenient order of masks is A, B, C, $\overline{D}$, $\overline{O}$, D, E, $\overline{B}$, $\overline{R}$, F, $\overline{P}$, $\overline{E}$, etc., placing the masks in order of the decision grouping for reasons that will be more particularly apparent as the description proceeds. The $\overline{B}$ mask differs from the B mask, for example, solely in its purpose and order within the sequence of masks.

The decision group selection is performed by means of a storage tube 50 and associated circuitry under the control of a logical group sequencer and counter 51. The storage tube, a conventional instrument such as the type designated as CK7571/QK685 Recording Storage Tube made by the Raytheon Company, incorporates a screen on which electronic charges may be selectively stored at various points thereof. The storage tube fires a beam of electrons from an anode (not shown) through a focus coil 49 and a deflection coil 52 to its storage screen 50, from which stored information may be read out via a collector line 54. The deflection coil of the storage tube is under control of the sweep generator 37 by means of connections not illustrated. As well known, information on the storage tube screen can be erased by placing the screen at a high potential and directing a relatively "hard" beam of electrons thereon, employing a high control grid potential. Displacement of electrons from the screen results in a fairly uniform positive charge thereon. The storage tube may then be primed in preparation for writing by depositing a uniform coating of electrons on the screen with the use of a heavy electron beam and a relatively low screen potential. In writing on the screen the screen potential is again raised and the control grid voltage is arranged substantially at or just below cutoff so that variations of the input signal applied to the control grid will raise the grid voltage to a point where the electron beam impinging upon the screen will dislodge electrons selectively according to the beam amplitude and provide positive charge storage. In the selective erase mode the storage tube has stored therein previously written information and it is desired to selectively erase certain portions of the information stored therein. In this condition the screen is again placed at a relatively low potential and the control grid is placed at the same potential as in the write mode. For readout from the storage tube the screen is placed at a potential just below that employed for selective erase and prime while the control grid is placed at a potential just above cutoff so that a relatively soft uniform electron beam will sweep the screen to provide the video output via the collector lead 54.

In the use of the storage tube for decision group selection the electrical indications of the maxima of a set are all written on the screen of the storage tube after the latter has been erased and primed. These electrical indications then appear as unique storage charges spatially distributed on the screen according to the spatial distribution of the patterns corresponding to the maxima that are written onto the storage screen. It will be recalled however that these maxima may include ambiguous maxima that must be eliminated in order to provide a distinct unambiguous indication of a given class of patterns. Thus, for example, when employing the class C mask, maxima are obtained for all C's, all D's and all O's and these are written on the storage tube 50. Then, with the storage tube in selective erase mode, the D mask is employed to provide D maxima and electrical pulses indicative of cross-correlation maxima therefrom are fed to the storage tube to effect selective erasure of all previously written D maxima which have been undesirably obtained by the immediately previous use of the C mask. Having erased the D maxima from the C decision group it is next necessary to erase the O maxima from this group. Whether D or O maxima are first erased is immaterial. This is achieved by placing the O mask into position, obtaining the maxima and electrical indications thereof, and employing these, again with the storage tube in selective erase mode, to eliminate from the face of the storage screen the O maxima that had previously and undesirably been obtained with the C mask.

It will be seen that the decision group selection is controlled largely by the sequence of operations of the storage tube modes and the movements of the mask. This sequence is under control of the logical group sequencer and counter 51. The latter comprises a counter for counting a predetermined number equal to the number of steps necessary to operate through the entire decision group one time and a conventional matrix for uniquely providing at respective counts on a number of output lines thereof the necessary control pulses for the sequencing of the storage tube and other parts of the system as will become apparent as the description proceeds. Each step or count has a duration substantially equal to the length of one vertical sweep period of the flying spot scanner.

For the particular embodiment described the logical group sequencer provides output leads designated as $W_1$, $W_2$, $W_3$, $W_4$, $W_5$, $W_6$, $W_7$, $W_{11}$, $W_{12}$, $W_{13}$, $W_{14}$, $W_{15}$, $W_{16}$, $W_{17}$ and $W_{18}$ respectively. These output leads have series of relatively high (0 volts) or relatively low ($-6$ volts) voltage pulses designated as 1 or 0 respectively, in accordance with the following table.

Table II illustrates the sequence of pulses on the several logical group sequencer output leads through and including the decision group for the letter E of an exemplary font. It will be readily appreciated that the remainder of the counts follows the order of the counts illustrated taking into account the particular order of the decision group as show in Table I. The total number of counts necessary depends upon the type of font and the number of classes of patterns obtained in the font together with the size and nature of the several decision groups.

The video output of mixer 39 comprising a train of pulses indicative of the maxima of several sets of maxima is fed through a video amplifier and gate 60 that is enabled by the presence of a pulse on lead $W_6$, of the logical sequencer. It will be understood that the pulses provided by the logic group sequencer will be of a duration substantially equal to or slightly greater than one frame duration since the counter of the sequencer counts vertical blanking pulses supplied from the horizontal and vertical blanking generator 38 via a lead 61. Enabling pulses exist on lead $W_6$ only when information is to be written upon the face of the storage tube, so that the sensor is disconnected from the storage tube 50 except during the write and selective erase frames. For the write operation the control grid of the storage tube must be placed substantially at cutoff. This and other required grid conditions are achieved under control of an electronic grid

*Table II*

| Count Number | | $W_1$ | $W_2$ | $W_3$ | $W_4$ | $W_5$ | $W_6$ | $W_7$ | $W_{11}$ | $W_{12}$ | $W_{13}$ | $W_{14}$ | $W_{15}$ | $W_{16}$ | $W_{17}$ |
|---|---|---|---|---|---|---|---|---|---|---|---|---|---|---|---|
| 1 | A Erase | 1 | 0 | 0 | 0 | 0 | 0 | 0 | 0 | 0 | 0 | 0 | 0 | 0 | 0 |
| 2 | Prime | 0 | 1 | 0 | 0 | 0 | 0 | 0 | 0 | 0 | 0 | 0 | 0 | 0 | 0 |
| 3 | Write | 1 | 0 | 0 | 1 | 0 | 1 | 0 | 0 | 0 | 0 | 0 | 0 | 0 | 0 |
| 4 | Read | 0 | 0 | 1 | 0 | 1 | 0 | 1 | 0 | 0 | 0 | 0 | 0 | 0 | 1 |
| 5 | B Erase | 1 | 0 | 0 | 0 | 0 | 0 | 0 | 0 | 0 | 0 | 0 | 0 | 0 | 0 |
| 6 | Prime | 0 | 1 | 0 | 0 | 0 | 0 | 0 | 0 | 0 | 0 | 0 | 0 | 0 | 0 |
| 7 | Write | 1 | 0 | 0 | 1 | 0 | 1 | 0 | 0 | 0 | 0 | 0 | 0 | 0 | 0 |
| 8 | Read | 0 | 0 | 1 | 0 | 1 | 0 | 1 | 0 | 0 | 0 | 0 | 0 | 1 | 0 |
| 9 | C Erase | 1 | 0 | 0 | 0 | 0 | 0 | 0 | 0 | 0 | 0 | 0 | 0 | 0 | 0 |
| 10 | Prime | 0 | 1 | 0 | 0 | 0 | 0 | 0 | 0 | 0 | 0 | 0 | 0 | 0 | 0 |
| 11 | Write | 1 | 0 | 0 | 1 | 0 | 1 | 0 | 0 | 0 | 0 | 0 | 0 | 0 | 0 |
| 12 | Switch | 1 | 0 | 0 | 1 | 0 | 1 | 1 | 0 | 0 | 0 | 0 | 0 | 0 | 0 |
| 13 | $\overline{D}$ Selective erase | 0 | 1 | 0 | 1 | 0 | 1 | 0 | 0 | 0 | 0 | 0 | 0 | 0 | 0 |
| 14 | Switch | 0 | 1 | 0 | 1 | 0 | 1 | 1 | 0 | 0 | 0 | 0 | 0 | 0 | 0 |
| 15 | $\overline{O}$ Selective erase | 0 | 1 | 0 | 1 | 0 | 1 | 0 | 0 | 0 | 0 | 0 | 0 | 0 | 0 |
| 16 | Read | 0 | 0 | 1 | 0 | 1 | 0 | 1 | 0 | 0 | 0 | 0 | 0 | 1 | 1 |
| 17 | D Erase | 1 | 0 | 0 | 0 | 0 | 0 | 0 | 0 | 0 | 0 | 0 | 0 | 0 | 0 |
| 18 | Prime | 0 | 1 | 0 | 0 | 0 | 0 | 0 | 0 | 0 | 0 | 0 | 0 | 0 | 0 |
| 19 | Write | 1 | 0 | 0 | 1 | 0 | 1 | 0 | 0 | 0 | 0 | 0 | 0 | 0 | 0 |
| 20 | Read | 0 | 0 | 1 | 0 | 1 | 0 | 1 | 0 | 0 | 0 | 0 | 1 | 0 | 0 |
| 21 | E Erase | 1 | 0 | 0 | 0 | 0 | 0 | 0 | 0 | 0 | 0 | 0 | 0 | 0 | 0 |
| 22 | Prime | 0 | 1 | 0 | 0 | 0 | 0 | 0 | 0 | 0 | 0 | 0 | 0 | 0 | 0 |
| 23 | Write | 1 | 0 | 0 | 1 | 0 | 1 | 0 | 0 | 0 | 0 | 0 | 0 | 0 | 0 |
| 24 | Switch | 1 | 0 | 0 | 1 | 0 | 1 | 1 | 0 | 0 | 0 | 0 | 0 | 0 | 0 |
| 25 | $\overline{B}$ Selective erase | 0 | 1 | 0 | 1 | 0 | 1 | 0 | 0 | 0 | 0 | 0 | 0 | 0 | 0 |
| 26 | Switch | 0 | 1 | 0 | 1 | 0 | 1 | 1 | 0 | 0 | 0 | 0 | 0 | 0 | 0 |
| 27 | $\overline{R}$ Selective erase | 0 | 1 | 0 | 1 | 0 | 1 | 0 | 0 | 0 | 0 | 0 | 0 | 0 | 0 |
| 28 | Read | 0 | 0 | 1 | 0 | 1 | 0 | 1 | 0 | 0 | 0 | 0 | 1 | 0 | 1 |
| m | Y Erase | 1 | 0 | 0 | 0 | 0 | 0 | 0 | 0 | 0 | 0 | 0 | 0 | 0 | 0 |
| m+1 | Prime | 0 | 1 | 0 | 0 | 0 | 0 | 0 | 0 | 0 | 0 | 0 | 0 | 0 | 0 |
| m+2 | Write | 1 | 0 | 0 | 1 | 0 | 1 | 0 | 0 | 0 | 0 | 0 | 0 | 0 | 0 |
| m+3 | Switch | 1 | 0 | 0 | 1 | 0 | 1 | 1 | 0 | 0 | 0 | 0 | 0 | 0 | 0 |
| m+4 | $\overline{W}$ Selective erase | 0 | 1 | 0 | 1 | 0 | 1 | 0 | 0 | 0 | 0 | 0 | 0 | 0 | 0 |
| m+5 | Read | 0 | 0 | 1 | 0 | 1 | 0 | 1 | 0 | 0 | 1 | 1 | 0 | 0 | 1 |
| n+6 | Z Erase | 1 | 0 | 0 | 0 | 0 | 0 | 0 | 0 | 0 | 0 | 0 | 0 | 0 | 0 |
| n+7 | Prime | 0 | 1 | 0 | 0 | 0 | 0 | 0 | 0 | 0 | 0 | 0 | 0 | 0 | 0 |
| n+8 | Write | 1 | 0 | 0 | 1 | 0 | 1 | 0 | 0 | 0 | 0 | 0 | 0 | 0 | 0 |
| n+9 | Read | 0 | 0 | 1 | 0 | 1 | 0 | 1 | 0 | 0 | 1 | 1 | 0 | 1 | 0 |
| n+10 | Output mode | 0 | 0 | 1 | 0 | 0 | 0 | 0 | 0 | 0 | 0 | 0 | 0 | 0 | 0 |

switch and clamp 63 that may be set into one of three possible states by the particular voltage combination appearing upon grid switch control leads $W_4$ and $W_5$ of the logic group sequencer as will be more particularly described below. The grid voltage level obtained from switch 63 is mixed with the output of the gated video amplifier 60 in a mixer 59 so that the control grid voltage level of the storage tube is raised sufficiently to write upon the storage screen 53 when pulses 43 are gated through the circuit 60.

Since the storage screen 53 must have the voltage thereof controlled between several different levels depending upon the particular storage tube mode there is provided a switch 64 for control of the storage screen voltage. Switch 64, more particularly described below, is under control of pulses provided on lines $W_1$, $W_2$ and $W_3$ of the logic group sequencer which set the switch to one of its three conditions to thereby set the storage screen voltage as required.

As can be seen in Table II the erase mode of the storage tube is controlled by the voltage combination 100 (e.g. 0, −6, −6 volts) on lines $W_1$, $W_2$ and $W_3$ respectively from the logic group sequencer. This voltage combination operates the electronic switch 64 to provide the required high erase potential on its screen 53. Thus, during the first count which has a duration equal to one vertical frame period of the flying spot scanner the storage screen lines $W_1$, $W_2$, $W_3$ are 100 respectively while the lines $W_4$, $W_5$, $W_6$ and $W_7$ are all 0. With both lines $W_4$ and $W_5$ zero grid switch 63 is placed in condition to provide a high voltage level on the control grid for the erase operation. $W_6$ is also 0 whereby video amplifier in gate 60 is disabled. Accordingly, the electron beam of the storage tube is of constant and high intensity controlled only by the high control grid level established by the switch 63 and the high screen potential. Output lead $W_7$ of the sequencer is 0 whereby the motor 45 is not energized. During count two the storage tube screen is primed by sweeping a heavy or "hard" electron beam across the screen which has the potential thereof at a relatively low level. The low screen level is provided by the switch 64 under the control of the voltage combination 010 on leads $W_1$, $W_2$, $W_3$ during the second count. In count 3 the set of maxima obtained during a complete vertical frame is to be written and stored upon the storage screen 53. Accordingly, the screen is placed in its write mode with a high potential thereon provided by 100 on $W_1$, $W_2$ and $W_3$ while the video gate 60 is enabled by a high potential on lead $W_6$. The grid potential required for writing is provided under control of the switch 63 that is operated to its second state by high and low signals respectively on lead $W_4$ and $W_5$. In mixer 59 this write grid bias is combined with the video to effect storage on the screen when video pulses occur.

For the read mode the screen voltage is at a level lower than that for prime and is controlled by 001 on $W_1$, $W_2$, and $W_3$. The control grid switch 63 has a 01 input from $W_4$, $W_5$ so that the grid potential is just above cutoff and the video gate 60 is disabled by the low level signal on $W_6$. Accordingly, during this count the information stored on the storage screen is fed from the storage screen via lead 54 through a video output amplifier 55, from whence it is supplied to the encoding portion of the apparatus as will be more particularly described hereinafter.

During the read operating the mask reel is stepped to position the mask to the next pattern which is the character B in this particular instance. The stepping of the mask is under control of a signal on line $W_7$ which in this count, count 4, is relatively high to cause the step motor 45 to operate and move the mask one step for positioning of the next pattern. For the character B the system goes through the same sequence of erase, prime, write and read operations as described in connection with the letter A. Similarly, for the letter C. This letter, however, is different in that it requires a decision group including $\overline{D}$ and $\overline{O}$. The set of maxima obtained with the C mask in the exemplary font described herein will include maxima corresponding to D's and O's on the document being read. Accordingly, after writing this set of maxima the apparatus goes into a switch mode as indicated at count 12 of Table II. In the switch mode the screen voltage remains high although if desired it may be placed in condition for the next mode, the selective erase mode. In the switch mode the video gate remains enabled by the high level of $W_6$ although this enabling is required only for the next mode, selective erase. The 10 input on leads $W_4$, $W_5$ of the control grid switch 63 places the control grid in condition for the writing which is achieved by the selective erase. If deemed necessary or desirable the video gate may be disabled during switch mode to avoid writing of transients or selective erasing during all switching and reading operations, although this is not provided by the illustrated logic.

In switch mode the storage tube conditions are of no significance as long as the information stored therein remains unchanged. In this mode the mask is stepped by the high level signal on lead $W_7$ to place the D mask into position so that maxima corresponding to the D patterns may be selectively erased from the information stored on the storage screen. For selective erase a modulated beam is caused to impinge upon the screen which now has a relatively low voltage level. Accordingly, $W_1$, $W_2$, and $W_3$ are 010 to lower the screen voltage while the control grid, under control of switch 63, is biased just at or below cutoff by the 10 on lines $W_4$ and $W_5$ respectively. The video amplifier in gate 60 is enabled by the 1 on $W_5$ in this operation. Accordingly, all maxima written by the C mask that are due to the existence of D's are erased from the storage pattern.

In the next count a 1 on $W_7$ again steps the mask to the next letter, O, of the C class decision group while the information on the storage screen remains unchanged. With the O mask in place in count 15 $W_6$ enables the video gate and the storage tube is in selective erase mode as indicated in Table II. All maxima read by the O mask are employed to intensity modulate the electron beam and selectively erase stored bits from those positions corresponding to O's on the document being read. Since the O's and D's read in selective erase modes will be the same as those O's and D's read by the C mask and written during count 11, and since such O's and D's are not desired in the class of C's, the selective erasure results in a distribution of charges on the storage screen 53 that exactly corresponds to the spatial arrangement solely of C's on the document being read.

Having completed the operations for one entire decision group the class of C's may be read. Accordingly, in count 16 $W_1$, $W_2$, $W_3$ are 001 to place the storage screen at its low potential, the grid control switch 63 is provided with a 01 input on lines $W_4$, $W_5$ to provide read mode grid bias and the video gate 60 is disabled. During this readout frame as during other readout frames a high level on the line $W_7$ is employed to operate step motor 45 and step the mask to the next pattern thereof. The operations subsequently required are performed under control of the logic indicated in Table II until all decision group selections have been performed.

The decision group selection circuitry comprising the storage tube 50 and its associated circuitry provides via video output amplifier 55 an electrical indication of all the maxima of the selected class in the form of a series of pulses each representative of a single maximum and of the specific letter corresponding thereto. These pulses are time spaced in accordance with the line by line horizontal sweep of the electron beam of the storage tube. These pulses at the video output amplifier 55 are encoded upon the screens of a plurality of encoding storage tubes 70 through 76 inclusive (FIG. 3*b*). Each of these storage tubes is identical to each other and to the storage tube 50 previously described, receiving its input signal from video mixers 77 through 83 that are fed by video amplifiers 84 through 90. The latter, in turn, amplify the outputs of a number of coincidence or And gates 91 through 97 inclusive. The And gates 91 through 97 are enabled individually or in a selected combination as indicated in Table II by enabling input connections with lines $W_{11}$ through $W_{17}$ inclusive. The gates are enabled so that the patterns of each class of patterns or of the different letters of the font will be stored on one or more of the storage tubes 70 through 76 according to a desired digital code which identifies the class of letters to which the individual letter belongs. In the illustrated embodiment a straight binary code is employed so that a straight binary code may be seen on lines $W_{11}$–$W_{17}$ in Table II at count Nos. 4, 8, 16, 20 and 28 which comprise the first five read times, wherein the letters A, B, C, and D and E respectively are read into the storage tubes 70 through 76. Thus, when A is read, only the And gate 91 is enabled, by $W_{17}$ being uniquely high, whereby the electrical indications or pulses representative of the maxima corresponding to all A's of the document read are stored solely on the screen of storage tube 70. The A's will be stored in a spatial arrangement, in the illustrated embodiment, that duplicates the spatial arrangement of the A's corresponding to such maxima on the document being read. Similarly, upon reading the character B, pulses representing the maxima corresponding to all letters B are read into the storage tube 71 by $W_{16}$ being uniquely high. This tube represents binary 2, and, accordingly, in the straight binary code employed, an indication stored only in this tube represents the letter B. For the binary representation of the letter C, pulses representatives of C's are read into both the storage tubes 70 and 71. Accordingly, at count 16 the reading of the C's is achieved by the enabling of And gates 91 and 92 together via high level signals on both $W_{16}$ and $W_{17}$. It will be seen that the letter G, for example, which is the seventh letter of the alphabet, will be read into each of the first three storage screens to cause the storage tubes 70, 71 and 72 to provide the binary indication 111, representative of decimal 7 or the seventh letter of the chosen alphabet. Thus, the first three And gates, 91, 92 and 93 are simultaneously enabled upon the reading of maxima corresponding to G's from the video output amplifier 55. The use of a straight binary code with seven encoding storage tubes as illustrated provides a capacity for handling 127 different patterns.

During the encoding operation the deflection coil of each of the encoding storage tubes is fed with the output of the sweep circuit 37 which also controls the deflection coils of the flying spot scanner 30 and the main storage tube 50. For operating the encoding deflection coils during erase, prime and write modes of the encoding operation there is provided an And gate 101 which selectively passes the sweep signals from generator 37 under the control of an enabling signal received from the output of an inverter 102 (FIG. 3*a*) that inverts the output $W_{18}$ of the logic group sequencer 51. The output $W_{18}$ (not illustrated in Table II) is −6 volts or low level throughout the reading of the entire document or page. Upon readout from the encoder into an output device such as a magnetic tape 24 of FIG. 2 the line $W_{18}$ is uniquely high for reasons that will be more particularly described. Thus, the $W_{18}$ output, normally low is inverted by inverter 102 to enable gate 101 during the entire reading operation prior to the readout to the output storage from encoding tubes 70–76.

The information stored in parallel binary form on the screens of encoding storage tubes 70 through 76 is read out via the collector lines of the several storage tubes through video amplifying and shaping circuits 103 through 109 to provide a seven channel parallel binary output to an output device such as seven of the heads of a multichannel magnetic tape recorder (not shown in FIG. 3).

In view of the inherent speed limitations of an output device such as the tape recorder or magnetic recorder the readout speed must be substantially decreased. Thus, there is provided a horizontal and vertical slow sweep generator 110 (FIG. 3*c*) having a horizontal and vertical sweep periods of 0.19 millisecond and 0.10 second respectively as compared with the horizontal and vertical sweep period of 63 microseconds and 33 milliseconds provided by the relatively fast sweep generator 37. As in the case of the fast sweep, the slow sweep generator 110 triggers a vertical and horizontal blanking generator 111 that feeds horizontal and vertical blanking pulses to the storage tubes by connections, not shown, and, via buffer amplifiers 112 and 133, to eighth and ninth output channels and thence to eighth and nineth write heads of the output magnetic recorder providing a line marker and a page marker respectively.

The sweep speed of the encoding storage tubes is changed at the end of the count $n+9$ of a complete read cycle as illustrated in Table II. In this table it is assumed that the pattern Z is the last of the classes of patterns to be read, whereby immediately after the reading of the Z class maxima from the storage tube 50 and into the encoding storage tubes 70 through 76 line, $W_{18}$ becomes high to disable And gate 101, disconnecting the fast sweep 37, and enabling an And gate 114 that feeds the slow sweep generator output to the encoding storage tubes. The signal $W_{18}$, uniquely high at the end of a complete readout, is fed via a line 115 to start the operation of the output magnetic recorder, the latter being operated by $W_{18}$ only during encoder storage tube readout.

Control of system readout is achieved by an end of page logic counter and sequencer 120 (Fig. 3*c*) that is zeroed by a start pulse from $W_{18}$ and counts the slow vertical blanking pulses from blanking generator 111. This sequencer, functionally similar to sequencer and counter 51 includes a counter and matrix for pulsing five output leads $W_{21}$, $W_{22}$, $W_{23}$, $W_{24}$, and $W_{25}$ in the order set forth in Table III.

*Table III*

| Mode | $W_{21}$ | $W_{22}$ | $W_{23}$ | $W_{24}$ | $W_{25}$ |
|---|---|---|---|---|---|
| Read | 0 | 0 | 1 | 0 | 1 |
| Erase | 1 | 0 | 0 | 0 | 0 |
| Prime | 0 | 1 | 0 | 0 | 0 |
| Write | 1 | 0 | 0 | 1 | 0 |

This counter controls the sequence of read, erase, prime and write steps indicated in Table III.

Two output leads $W_{24}$, $W_{25}$ control the three states of a grid control switch 121 that is functionally and structurally similar to switch 63 and which provides the proper storage tube control grid bias for the read, erase, prime and write modes. As described in connection with the storage tube 50 there is provided a screen potential control switch 122, structurally and functionally similar to screen potential control switch 64, to control the screen voltage under command of signals supplied via leads $W_{21}$, $W_{22}$, $W_{23}$ of the end of page logic counter 120.

Since the encoder storage tube readout requires four counts of counter 120 and since the vertical sync periods counted by the counter 120 are considerably longer than the periods counted by the counter of logic sequencer 51, the line $W_{18}$ remains true for a number of the counts of the counter of sequencer 51 sufficient to complete the end of page readout. This maintains the gate 101 disabled and gate 114 enabled to obtain the proper sweep speed during end of page readout. Upon occurrence of the first high level signal on $W_{18}$ immediately following the last readout (count $n+9$) of primary storage tube 50, the end of page logic counter 120 is reset to zero by $W_{18}$. At the next vertical blanking pulse from blanking generator 111 the output leads $W_{21}$ to $W_{25}$ are placed in read mode as indicated in Table III. During this read mode the bias on the storage tube control grid and the potential on the storage tube screens are maintained in the read mode while the appropriate output information is provided by video amplifier and shaper circuits 103 through 109, tape starting lead 115 and line and page marking leads 116 and 117. If deemed necessary or desirable, in view of time logic involved in starting the magnetic output storage device, the start signal on line 115 may be provided by the count $n+9$ or a preceding count of the sequence of Table II.

In the second step of the end of page readout the encoding storage tubes are erased by signals as indicated in Table III. Subsequently, the storage tube is primed and then in the final step, it is placed in the write condition. Since the encoding storage tubes 70 through 76 must remain in the write mode until the completion of the last readout at $n+9$ of the primary storage tube, the state of the end of page logic counter must be retained until the end of page readout is again desired. Accordingly, the pulses counted by the end of page logic are supplied only during the existence of the high level $W_{18}$ signal. This is achieved by the application of the slow speed vertical blanking pulses from blanking generator 111 to the counter 120 via And gate 123 that is enabled by the $W_{18}$ pulse. Thus, the line $W_{18}$ is high for a predetermined interval as is necessary to complete the end of page readout. Upon the termination of the high level signal on $W_{18}$ the counter output is such as to place the encoding storage tubes in the write mode. At this time the count stops changing until $W_{18}$ again goes high. The end of page logic counter remains in this condition through the readout of the next page of the material being read. The encoding storage tubes have a grid bias and storage screen potential that enables the writing of information read from the primary storage tube 50 during reading of a subsequent page.

During the end of page readout, when $W_{18}$ is high, the page being read is replaced by the next page to be read. Accordingly, the line $W_{18}$ may be employed to operate a page changing mechanism (not shown) for the purpose of providing automatic page changing that will take place during the readout into the magnetic storage device. Although automatic page sequencing will increase the speed of the operation of the apparatus, it will be readily appreciated that manual page sequencing may be employed.

For recycling of the logic group sequencer and counter 51 the termination of the high level output of $W_{18}$ is utilized to zero the counter of sequencer 51 which then will again start its count of vertical blanking pulses from the blanking generator 38. $W_{18}$ is maintained high during system readout by connections with a selected number of counts of the sequencer counter matrix described below.

It will be readily seen that the signal 40 appearing at the output of the sensor of the apparatus described in FIG. 3 is essentially similar to the electrical signal appearing at the output of the sensor described in FIG. 2, whereby the processing circuitry including the logic control, encoding, and decision group selection described in FIG. 3 may be employed with the sensor of FIG. 1. In the latter, of course, the image orthicon will employ a sweep generator substantially analogous to generator 37 of FIG. 3 with the remainder of the circuitry synchronized therewith. It will be readily appreciated that there may be substituted for the image orthicon of FIG. 1 an iconoscope or a vidicon, all conventional television type sensing instruments well known in the art. So, too, different arrangements of document and mask transparencies may be employed with the light being transmitted through one and then the other or with light beam transmitted through either to the other or from either through the other, so that the light is transmitted through the documents for the purpose of effecting the described cross-correlation.

The apparatus may be adapted for the reading of different fonts or different classes of patterns simply by changing the masks and the programmed control of the signal sequence on the logic group sequencer output leads. Accordingly, these portions may be simply changed by use of plug-in components or the like to adapt the apparatus for the reading of many different types of fonts or different classes of patterns. Further, it will be appreciated that the patterns of the masks need not exactly match the patterns of the font to be read. The several mask patterns may be distorted intentionally to be made more sensitive to unique aspects of the several patterns. In this manner it is possible, with certain fonts, to decrease the size of the required decision group. Conversely, the size of the decision group may be increased in order to enable a single group of masks to handle a number of related but mutually distinct fonts. Thus, one may use a single set of logic and a single set of masks to read an increased number of classes of patterns at the expense of the increase in time required by the increased number of the decision groups or characters in a decision group.

Preferably, with the desired advantage of speed and simplicity of equipment, the system of FIG. 3 is arranged so that light projected by the flying spot scanner will have a vertical width as illustrated in FIG. 3 just larger than the vertical height of the characters of the font printed on the document 31 at the point where the light impinges upon the document. The system is arranged thus so that but a single horizontal scan is required for each horizontal line of patterns to be recognized and the vertical sweep speed is arranged to cause each horizontal sweep to sweep across a line of print on the document. It will be readily appreciated, however, that this relation of flying spot scanner beam width and letter height is not necessary since one may employ a flying spot scanner beam that is considerably smaller than the character height. With such an arrangement, of course, there will occur a number of horizontal scans for each line of characters. In effect, each one of such plural horizontal sweeps or line of characters will obtain but a portion of the "black dot" produced or formed as the cross-correlation maxima as described in connection with FIG. 1. Such portion of a "black dot" will be "painted" on the screen of the primary storage tube 50 in the sequence in which it was obtained. On the immediately subsequent horizontal sweep a second portion of such "black dot" will be obtained and electrical indication thereof provided. This second portion will be "painted" on the storage tube screen in immediate vertical juxtaposition to the first such painted portion so that the entire "black dot" will have been "painted" and stored on the storage tube screen after completion of the total number of horizontal sweeps required for any given horizontal line of characters of the document.

Figure 4:
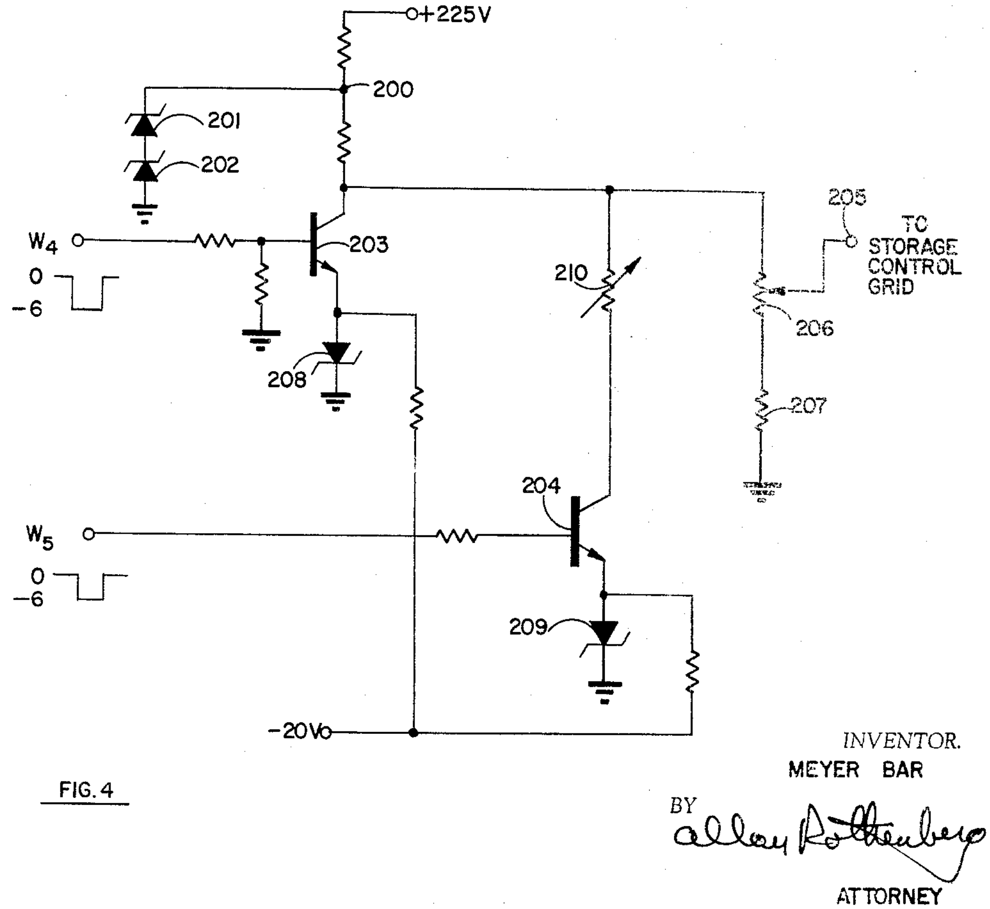
FIGS. 4, 5 and 6 illustrate certain circuit details of the embodiment of FIG. 3.

Circuitry of the electronic grid control switch and clamp 63 is illustrated in FIG. 4 and comprises an arrangement for feeding a voltage of a predetermined value to the storage tube control grid through a circuit path including a pair of individually switched shunt paths. A fixed potential is provided at a point 200 from a source of potential such as +225 volts by means of a predetermined voltage drop controlled by the limiting action of a pair of zener diodes 201 and 202. This potential may be transmitted to the output through the suitable resistive paths. A pair of shunt paths are provided, switched by respective ones of NPN transistors 203 and 204, the latter being controlled in turn by high or low (zero volt or −6 volts) potentials provided on input control leads $W_4$ and $W_5$ to the transistor bases. When both transistors are cut off, as by a −6 volt signal to the base of the transistors, an output potential appears at a terminal 205 that is connected to the storage tube control grid. The output potential is developed across a potentiometer 206 and a fixed resistor 207 connected between the collector of transistor 203 and ground. When the input terminal connected to the base of transistor 203 is high, at zero volts, the transistor conducts to provide at its collector a voltage of substantially −3.3 volts as controlled by a ground zener diode 208 connected to the collector and a source of potential such as negative 20 volts. The output voltage is thus shunted by conduction of transistor 203, with transistor 204 cut off, whereby the output at terminal 205 is substantially −3.3 volts.

When transistor 204 is uniquely conducting by a high level signal applied to its base, its collector is held at substantially −3.3 volts by zener diode 209 and a connection to the negative potential source which is substantially identical to the arrangement involving zener 308. In this instance, however, the output voltage is held to a value that is controlled by a variable resistor 210 connected between the transistor collector and the high potential end of output potentiometer 206. Thus with transistor 204 uniquely conducting the output potential will vary, depending on the setting of potentiometer 206 and variable resistor 210, between 52 and 20 volts above ground. Accordingly, it will be seen that where the storage tube cathode is held at a positive potential of about 60 volts a low signal to both transistors will provide a relatively high control grid voltage for the storage tube and thus provide maximum conduction thereof. This arrangement is employed in the prime and erase modes where $W_4$ and $W_5$ are both low.

With a high level signal to transistor 203 only, the control grid of the storage tube is at about −3.3 volts, just at or below cutoff as required by write and selective erase modes. With transistor 204 uniquely conducting the storage tube control grid is maintained at a value somewhat less than 50 volts depending upon the setting of variable resistor 210 to provide for a desired magnitude of conduction as required for the read mode. Potentiometer 206 is provided to adjust the magnitude of conduction in all modes.

Figure 5:
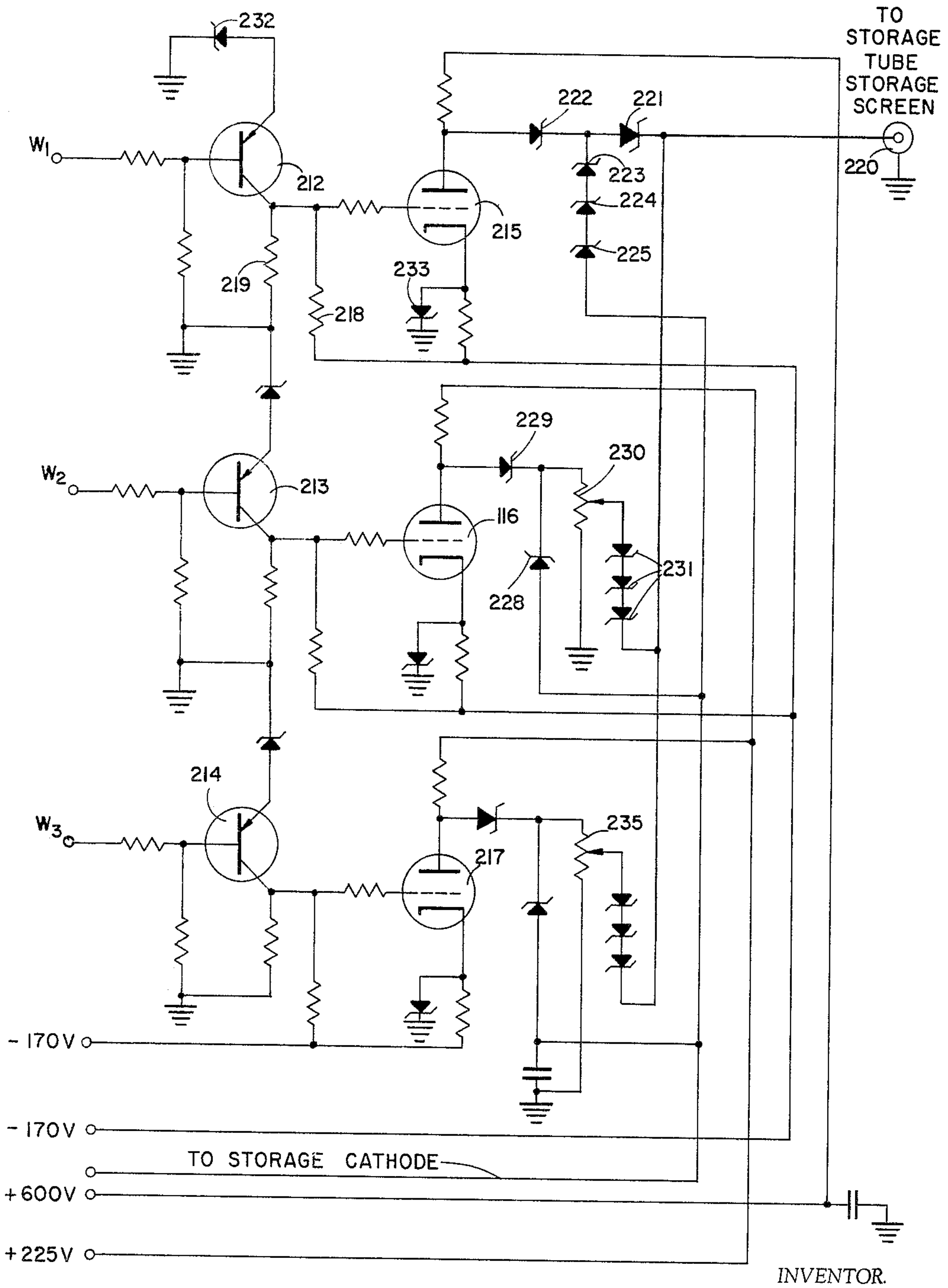

The electronic storage screen switch 64 is illustrated in detail in FIG. 5 as comprising three input or control PNP transistors 212, 213, and 214 having control signals applied thereto by leads $W_1$, $W_2$ and $W_3$ respectively, and, in turn, operating to control conduction of triodes 215, 216 and 217 respectively. As will be apparent from the description of the sequence of signals on leads $W_1$, $W_2$ and $W_3$, the logic provides for conduction of but a single one of the transistors 212, 213, 214 for any given mode. For example, when a zero volt or high level signal is applied via $W_1$ to the base of transistor 212, −6 volt signals are applied via $W_2$ and $W_3$ to the bases of transistors 213 and 214 whereby both the latter will conduct and transistor 212 is cut off. Collector potential of the cut off transistor 212 will be at roughly −94 volts as controlled by the drop across a voltage divider comprising resistors 218 and 219 having a common junction connection to the transistor collector and being series connected between ground and a source of negative, tube 215 is cut off by virtue of the resistive connection between its control grid and the transistor, whereby the tube plate tends to rise toward the plate supply voltage level of +600 volts. The tube plate is connected to an output terminal 220 of the switch, via an isolation diode 221 and zener diode 222 that in this arrangement is operating solely as a conventional diode. Terminal 220 is connected to the storage tube screen. It may be noted that the circuit arrangement employs zener diodes operating as conventional diodes in certain situations because of the high back voltage protection afforded by the zener.

As the plate of tube 215 rises toward plate supply level it is subject to the limiting action of series connected zener diodes 223, 224, and 225 having one end thereof connected via lead 226 to the cathode of the storage tube. The zeners limit the potential difference between storage tube cathode and switch output to 300 volts. Accordingly, the output potential at terminal 220 will rise to a level substantially equal to 300 volts above the level of the storage tube cathode, when the input to transistor 212 is uniquely high.

When the input to transistor 213 is uniquely high this transistor will be cut off to effect cutoff of the vacuum tube 216 controlled thereby in a manner substantially similar to that described in connection with transistor 212 and tube 215. Accordingly, the plate of tube 216 tends to rise toward its plate potential supply, in this case +225 volts, but is limited to a value 36 volts above the storage tube cathode by the limiting action of a zener diode 228 connected between the storage tube cathode, lead 226, and one side of a zener diode 229 that is connected to the tube plate and acts in this case as a conventional diode. The output voltage of tube 216 is taken across an output potentiometer 230 and, via a series of zener diodes 231, acting in this case as conventional forward conducting diodes, to the switch output at terminal 220.

When any one of the transistors and its associated vacuum tube is cut off the others are conducting due to the −6 volts applied to the transistor base. For example, when a −6 volt signal is applied to the base of transistor 212 the latter conducts to provide at its collector a potential of −3.3 volts as controlled by the limiting action of a zener diode 232 connected between the transistor emitter and ground. This −3.3 volt potential at the transistor collector holds the associated vacuum tube 215 in conduction cutoff since the cathode of the latter is maintained at substantially negative potential by the limiting action of a zener diode 233 connected between the cathode and ground, the cathode being resistively connected to the −170 volt source. The connections and operations of each of the combinations of transistor and vacuum tube, each combination comprising a two stage noninverting amplifier, are substantially identical for the conduction condition of these components. In non-conduction the combination of transistor 214 and tube 217 is connected and operates substantially identically to the described combination of transistor 213 and 216. The difference between the latter two combinations are in the setting of the output potentiometer. Thus, with transistor 213 and tube 216 controlling prime and selective erase modes, the output potentiometer 230 is set to provide a nominal screen potential relative to storage tube cathode of +20 volts whereas with the combination of transistor 214 and tube 217 controlling in read mode, the output potentiometer 235 is set to provide a nominal screen potential of 15 volts.

Figure 6:
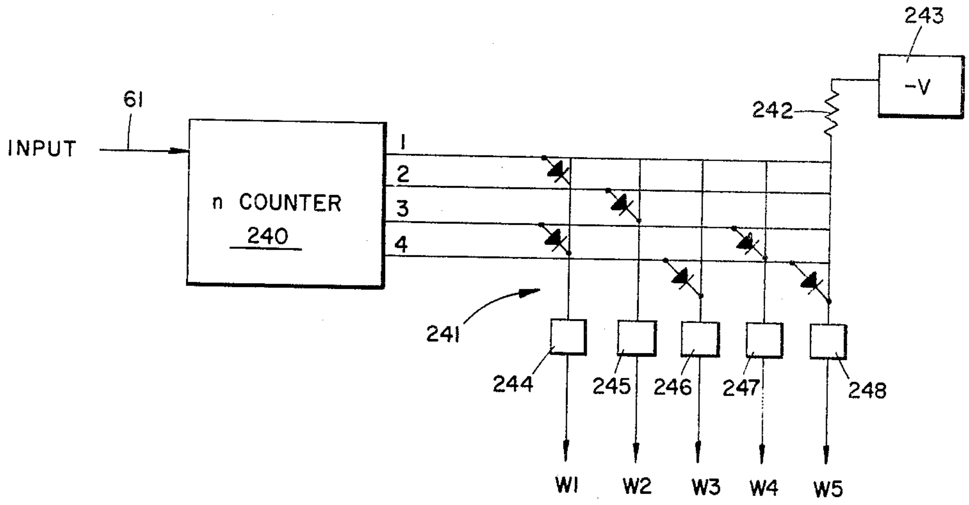

FIG. 6 is a circuit arrangement illustrative of the principles of the logic sequencer and counter 51. There is provided a counter 240 that counts input pulses supplied via lead 61 from the horizontal and blanking generator 38. The counter 240 has an output lead for each of its counts, illustrated as counts 1, 2, 3, and 4 in FIG. 6 so that these leads will be energized with a high signal uniquely on successive counts of the counter. A conventional diode matrix 241 is energized via a resistor 242 from a source of negative potential 243 and has outputs to lines such as for example $W_1$, $W_2$, $W_3$, $W_4$ and $W_5$ via impedance isolation devices such as cathode followers 244 through 248 respectively. For example, at count 1 a positive signal on the appropriate counter output will provide a high signal on $W_1$. So too, in the illustrated arrangement, a positive signal occurring on counter output 3 at count 3 will provide a high signal on $W_1$. At count 3 a high signal is also provided on lead $W_4$. So too, in accordance with the Table II count 4 will provide high outputs on both $W_3$ and $W_5$. It will be readily understood that the counter will have a number of outputs equal to the total number counts of a complete set of operations as indicated in Table II while the matrix outputs will include $W_1$ through $W_7$ and $W_{11}$ through $W_{18}$ connected according to the logic of Table II. $W_{18}$, which remains high for a number of successive counts, is connected with a number of consecutively activated matrix inputs.

Figure 7:
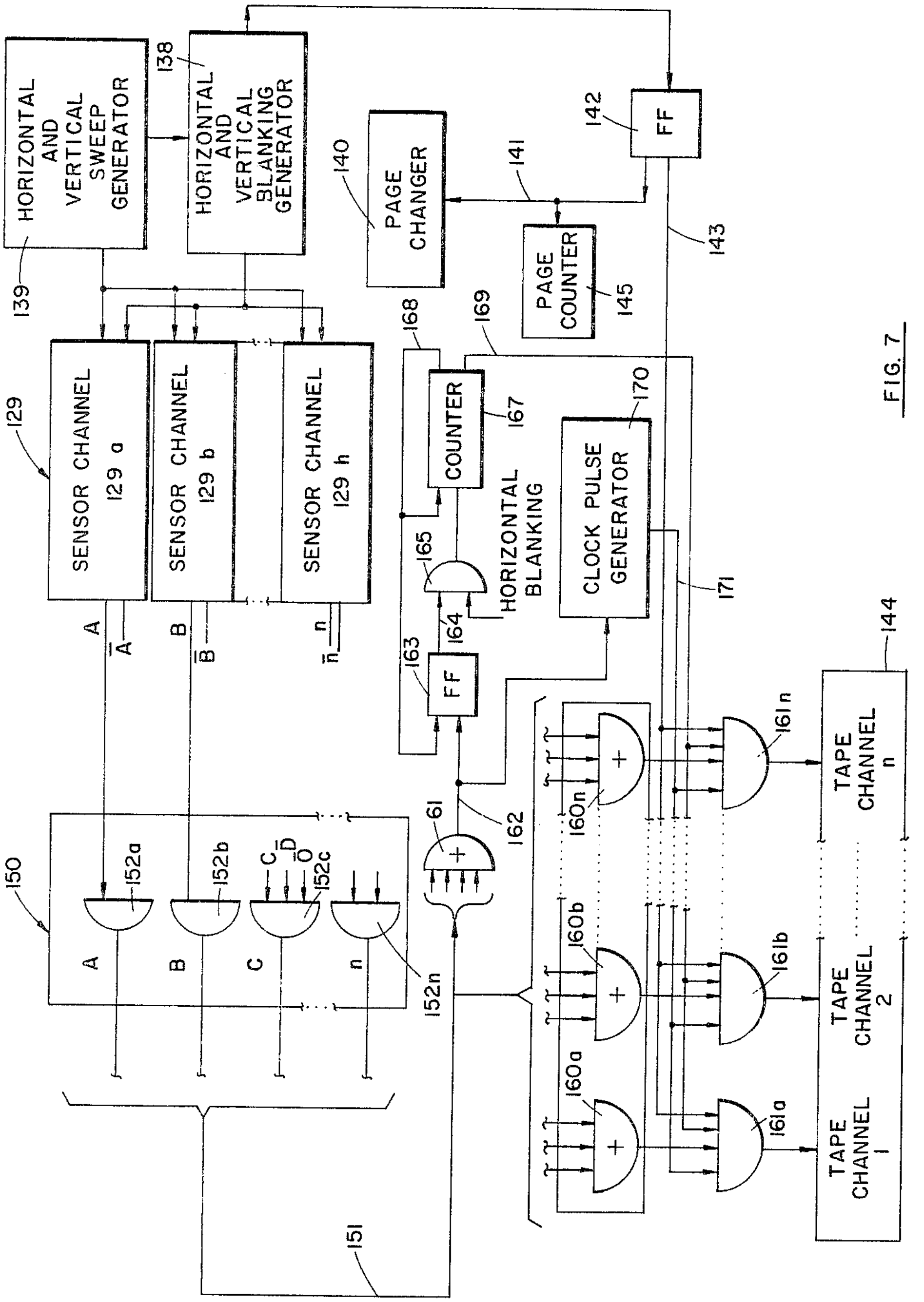
FIG. 7 illustrates details of an embodiment of the invention employing parallel reading of the masks wherein all patterns on an entire document may be read together.
Figure 8:
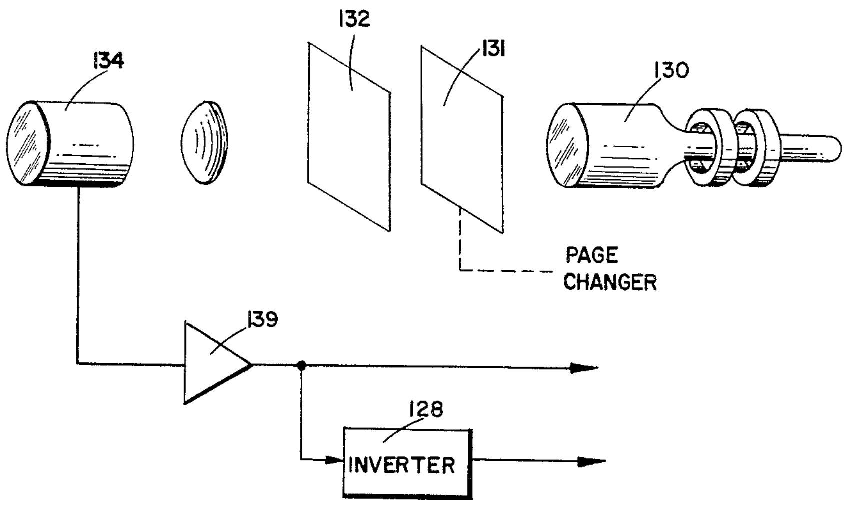
FIG. 8 depicts the sensor of the embodiment of FIG. 7.

The apparatus of FIG. 3 is a serial type device in that masks are presented sequentially to obtain sets of cross-correlation maxima, each set comprising a maximum for all patterns of a class corresponding to the selected mask. It will be readily appreciated, however, that where speed of operation is of increased significance as weighed against the amount of equipment required, some form of parallel operation of the masks may be employed in the place of the illustrated series arrangement. Thus in the sensor of either FIG. 1 or that of FIG. 3 two or more masks may be interposed between the document and the lens with a sensor for each such mask so that a number of sets of cross-correlation maxima may be obtained together. With such an arrangement patterns of a number of classes of patterns may be collectively recognized and identified as to class and position in the document. Extending this concept of parallel operation one may provide a system that collectively obtains sets of cross-correlation maxima for all patterns of all classes being read. Thus, in a parallel page reading apparatus there will be provided one mask for each character of the font to be read and all of the characters on a given page may be read together. Such an arrangement is illustrated in FIG. 7 which employs a sensor assembly 129 including a plurality of sensor channels of which only those designated as **129*a*, 129*b* and 129*n* are shown. There is provided one such sensor channel for each character of the font to be read. Accordingly, where a font includes characters A through Z there will be twenty six sensor channels. The document to be read is duplicated for each channel so that one document identical to each other document is provided for illumination by optical sensor beams. Each sensor channel, illustrated in detail in FIG. 8, is substantially similar to that illustrated in FIG. 3 and includes a flying spot scanner 130, a document page 131, identical for each channel, a lens 133, and a photomultiplier tube 134, all constructed and arranged as described in connection with the corresponding elements of FIG. 3. While for the reading of any given document page all of the documents in each sensor channel are identical, the masks 132** of the several sensor channels are different, each mask of course corresponding to a single given class of patterns or a particular letter of the font to be read. Accordingly, masks for reading of 26 capital letters will comprise, respectively, the patterns representing the letters A through Z, inclusive.

The output of the photo tube in each sensor channel is fed to a clipper amplifier 139 which amplifies the signal and removes low level noise to provide a series of electrical pulses of substantially equal amplitude representative of the cross-correlation maxima. Each sensor channel includes an inverter 128 responsive to the amplifier 139 so that each channel will provide pulses of both polarities as required by the decision group selection logic described below. Thus, the "A" sensor channel will provide the outputs A and A, the B channel B and B, etc.

The several flying spot scanners 130, as described in connection with FIG. 3, will include the appropriate conventional focusing of coils and horizontal and vertical deflection coils, the latter being all fed with identical signals from a horizontal and vertical sweep generator circuit 137 which triggers horizontal and vertical blanking generator 138 also feeding appropriate blanking vertical and horizontal signals to the synchronized flying spot scanners.

In the described parallel arrangement of FIG. 7 all patterns or characters on an entire document are read during one vertical frame period. During the immediately succeeding frame period the document pages are changed by a change mechanism 140 under control of a page change signal supplied on lead 141 from a scale-of-2 counter or flip flop 142 that counts vertical blanking pulses from generator 138. The counter 142 shifts from one of its two states to the other each time a vertical blanking pulse is received and provides on its output lead 143 signals for enabling and disabling a magnetic storage device such as a moving magnetic tape 144 that is employed to receive the digitally coded indications of the characters read from the document. In one state of the counter 142 output line 143 thereof is high to enable the storage tape. In this condition, document reading is occurring as will be more particularly described below, with the outputs of such reading being fed into the output tape. With the counter in the other of its conditions line 141 is high and 143 is low to disable input to the tape and provide a page change signal to operate the page changer 140 of which the details form no particular part of this invention. The page change signal on lead 141 is also supplied to a page counter 145 that will provide a desired page count. This page count may be recorded as will be described on appropriate channels of the output tape device 144. If desired the output of flip flop 142 may also be employed to start and stop the tape to eliminate tape motion during page change operation.

The clipper amplifiers 139 each will provide an electrical output including substantially equal amplitude pulses representing all of the cross-correlation maxima of the patterns within all classes of a decision group as set forth in Table I. Accordingly, the outputs of the several amplifiers 139 and inverters 128 are fed to decision group selection logic collectively indicated at 150 and including a plurality of And gates of which only those designated as 152*a*, 152*b*, 152*c* and 152*n* are shown. The logic of this decision group selection is as set forth in Table I. Each of the And gates correspond to the several letters of the alphabet as indicated as the inputs shown by the decision groups of Table I whereby the And gate outputs will each be uniquely indicative of all maxima corresponding to its particular class of patterns.

Thus, gates 152*a* and 152*b* corresponding to letters A and B respectively simply have inputs A and B, the non-inverted outputs of the A and B sensor channels respectively since there is no ambiguity indicated in Table I for the A and B. The "C" gate, 152*c*, however has three inputs as defined by the decision group logic of Table I. There is a first input from the non-inverted output of the "C" sensor channel, and second and third inputs from the inverted outputs of "D" and "O" sensor channels whereby the output of gate 152*c* is unambiguously representative of all C class cross-correlation maxima.

The parallel outputs A through Z of the decision group selection And gates are collectively fed as indicated at 151 to an encoding matrix 160 including a plurality of encoding Or gates of which only those indicated at 160*a*, 160*b* and 160*n* are shown. The outputs of these Or gates are fed via And gates 161*a*, 161*b*, 161*n* etc. to the output device which in this embodiment takes the form of a multi-channel magnetic tape recorder 144 with And gates individually feeding channel read heads for the respective tape channels. The encoding matrix 160 provides a straight binary coding for class identification of the recognized patterns so that, for example, a maxima representative of A is fed only to Or gate 160*a* to provide a signal to tape channel 1 while tape channel 2 is uniquely energized for B character via Or gate 160*b* which alone receives an output from And gate 152*b* of the decision group logic 150. Tape channels 1 and 2 are both energized for the character C and the tape channel 3 is uniquely energized for the character D with this straight binary coding being continued by the arrangement of inputs to the Or gates of matrix 160 to the extent of the number of characters of the front being read. Six binary coding channels of the tape and six Or gates of the matrix 160 provide for the reading of a font including 63 classes of patterns. For page number identification additional tape channels are fed by Or gates of matrix 160 having appropriately coded arrangement of inputs (not shown) from the page counter 145 so that parallel page count may be written onto the tape 144.

One channel may be employed to record the page change operation and is fed with a signal from the output 141 of counter 142. With this page change signal appearing on the tape the remainder of the channels are of a random nature and of no significance since the existence of the signal in the page change channel indicates that the changing operation is occurring.

The sweep rate of the flying spot scanners may be such as to effect a number of complete horizontal scans for each line of document print. In one arrangement six or more horizontal scan lines of a flying spot scanner will cover a vertical distance of the document from the bottom of one line to the bottom of the next line. If the spaces between lines of a document are substantially equal to the vertical height of a document line there will be approximately three sweeps of the flying spot scanner for each line of document print. In this case two of such sweeps will be redundant and may be suppressed. Accordingly, there is provided a redundancy suppression gating arrangement that operate to enable writing on the tape 144 during only one horizontal scan for each line of the document scanned. This suppression gating is accomplished by means of an Or gate 161 that is arranged to receive outputs from all of the And gates of the decision group logic 150 so as to provide on line 162 a series of character pulse trains, each train having a pulse for each and every character for which a cross-correlation maxima is obtained. The character pulse trains are fed to set a flip flop or bistable device 163 that, when set, provides an output on a lead 164 to an And gate 165 enabled by horizontal blanking pulses on a line 166 provided from horizontal and vertical blanking generator 138. When flip flop 163 is set And gate 165 provides, for each horizontal blanking pulse, an output pulse that is fed to a counter and logic circuit 167 that counts the And gate pulse outputs and provides a series of signals on output leads 168 and 169 in accordance with the logic of the following table:

*Table IV*

| Count | 169 | 168 |
|---|---|---|
| 0 | Low | Low |
| 1 | High | Low |
| 2 | Low | Low |
| 3 | Low | Low |
| 4 | Low | High |

The high counter output on lead 168 is fed back to reset flip flop 163 and also to zero-set the counter 167.

Assuming the scanner to make three horizontal sweeps of each character line on the document, it will be seen that a train of character pulses each corresponding to the pulses obtained from scan of a single line will be obtained for each scan and that there will be, accordingly, three consecutive substantially identical trains of character pulses for each line of the document. The first pulse of a first train of the three trains will be fed via line 162 to set flip flop 163 providing a first input via line 164 to And gate 165 which remains enabled until the flip flop is reset at count 4 (see Table IV). Accordingly, And gate 165 will provide an output upon occurrence of the next horizontal blanking pulse and the counter proceeds to count 1. When the counter 167 reaches its first count as indicated in Table IV, line 169 is high while 168 remains low. Line 169 is fed as one of three enabling inputs to each of the And gates 161*a*, 161*b*, 161*n*, etc. whereby during this count of counter 167 writing of the second of the three character pulse trains may take place. At the second count of counter 167 both leads 168 and 169 are low as they are at the third count. Thus, writing into tape 144 is suppressed. On the fourth count line 169 remains low to maintain the And gates 161*a* etc. in disabled condition while line 168 goes high to reset flip flop 163 and zero counter 167. With this arrangement it will be seen that writing into the tape is enabled only for every fifth horizontal scan at the most but is not initiated until the second scan of any given series. As long as flip flop 163 remains reset, a condition maintained for at least three horizontal scan periods subsequent to that in which writing is enabled, the redundancy suppression gating prevents writing into the tape.

In order to sharpen and provide uniform width for the pulse fed to each tape write head and to limit writing of each character to a portion of the time required for scan of a character, the writing onto the tape is clocked for a predetermined interval, preferably less than the time required for the scanner beam to traverse the horizontal width of a given character of the document to be read. To this end there is provided a clock pulse generator 170 that is triggered from each pulse of the train of character pulses provided on lead 162 at the output of Or gate 161. The clock pulse generator thus provides a single pulse for each character and is arranged to provide such a pulse for a duration less than the time required to sweep the width of a single character. The clock pulses are fed via lead 171 as additional inputs to each of the several And gates 161*a*, etc. Thus, it will be seen that the writing on the tape is enabled by the coincidence of three conditions. There must be an enabling signal from the redundancy suppression counter 167; there must be an enabling signal from the clock pulse generator 170; and there must be an enabling signal from the page changer via lead 143 indicating that page change operation has been completed. When these conditions exist simultaneously the pulses representative of the several maxima will be passed on the Or gates of matrix 160 through the And gates to be recorded on the tape 144.

Since the flying spot scanners scan the document pages line by line in a full vertical frame period, outputs of the Or gates of encoding matrix 160 comprise sequential indications in parallel binary code of the letters scanned by the flying spot scanners. The particular combination of tape channels that is energized for any line of tape information comprises a parallel binary code representative of the identity of the particular character while the position of such line on the tape, or the sequence of such parallel combinations as fed to the tape heads, represents the location of the character so identified on the document page being read.

It will be seen that the described apparatus provides rapid recognition, identification and recording of various types of patterns and groups of patterns and is readily adapted for reading of different fonts of characters with a simple and rapid substitution of masks and plug-in logic.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. Pattern recognition apparatus comprising
sensing means for providing a set of indications of maxima of optical cross-correlations between patterns of a group and a mask representing a pattern to be recognized, said set of indications including ambiguous indications of cross-correlation maxima of said mask with other patterns of the group, and
decision group selection means for eliminating said ambiguous indications from said set.

2. The apparatus of claim 1 wherein the decision group selection means comprises
means for storing indications of said set in a spatial distribution corresponding to the spatial arrangement of patterns providing the indicated maxima, and
means for selectively removing indications from said storage having locations that correspond to patterns providing said ambiguous indications.

3. The apparatus of claim 1 wherein the decision group selection means comprises
means for inverting said ambiguous indications, and
means for combining the inverted indications with the ambiguous indications of said set.

4. Apparatus for recognizing patterns in a group of patterns comprising:
optical sensing means for providing electrical indications of sets of maxima of the cross-correlation functions of a mask and matching patterns of the group,
decision group selection means responsive to the sensing means for eliminating ambiguous indications from each of the sets of cross-correlation maxima,
logic control means for controlling the decision group selection means according to a predetermined program,
encoding means responsive to the decision group selection means for providing electrical signal combinations identifying the maxima of the sets according to the class of patterns represented by each maximum and the position of the corresponding pattern within the group, and
storage means coupled with the output of the encoding means.

5. Apparatus for recognizing patterns of a document comprising a series of masks,
a flying spot scanner,
a document interposed between a mask of the series and the scanner,
a lens,
a photo-sensitive device in the focal plane of the lens for collecting light transmitted from the document and mask through the lens,
a sweep and blanking pulse generator for controlling the flying spot scanner,
a storage tube having a beam sweep controlled by the sweep generator, and having a screen and control grid,
a video gate having an input connected to the output of the photo-sensitive device and an output connected to modulate the storage tube beam,
a grid switch for controlling the storage tube control grid,
a screen switch for controlling the storage tube screen,
a logic group sequencer and counter responsive to pulses from said sweep and blanking generator for providing a plurality of control signals for sequentially conditioning the storage tube to erase, prime, write, selective erase, and read modes according to a predetermined program, said control signals including an enabling signal for enabling the video gate when the storage tube is in write mode, and a plurality of switch control signals for operating said switches to sequentially control electric potential on the grid and screen of the storage tube and place the storage tube in a programmed sequence of modes,
means responsive to the sequencer for sequentially positioning masks of the series between the document and scanner according to a predetermined program, and
output means for encoding information contained on the storage tube screen according to identity and position.

6. Apparatus for recognizing patterns of a document comprising a series of masks,
a flying spot scanner,
a document interposed between one of the masks and the scanner,
a lens,
a photo-sensitive device in the focal plane of the lens for collecting light transmitted from the document and mask through the lens,
a sweep and blanking pulse generator for controlling the flying spot scanner,
a primary storage tube having a beam controlled by the sweep generator, and having a screen and control grid and a screen output,
a video gate having an input connected to the output of the photo-sensitive device and an output connected to modulate the storage tube beam,
a grid switch for controlling the storage tube control grid and a screen switch for controlling the storage tube screen, a logic group sequencer and counter responsive to pulses from said sweep and blanking generator for providing a plurality of control signals to sequentially condition the storage tube to erase, prime, write, selective erase, and read modes according to a predetermined program, said control signals including an enabling signal for enabling the video gate when the storage tube is in write mode, and a plurality of switch control signals for operating said switches to sequentially control electric potential on the grid and screen of the storage tube and place the storage tube in the programmed sequence of modes, means responsive to the sequencer for sequentially positioning the masks between the document and scanner according to a predetermined program, a plurality of encoding storage tubes, a plurality of And gates for passing the output of the primary storage tube to the encoding storage tubes, said logic group sequencer and counter having a plurality of output leads providing control signals to the encoding And gates to enable the And gates according to a predetermined digital code that identifies the mask of said series of masks corresponding to the information being fed from the primary storage tube to the encoding And gates, a grid switch and a storage screen switch for controlling the grids and screens of the encoding storage tubes, an end-of-page logic counter and sequencer for controlling the grid and screen switch of the encoding storage tubes to place the encoding storage tubes in read, erase, prime and write conditions sequentially, said encoding storage tubes having a beam sweep controlled from said sweep and blanking pulse generator, a slow speed sweep and blanking pulse generator for controlling the encoding storage tubes, said first mentioned logic group sequencer and counter having an end-of-page output for initiating operation of the end-of-page logic counter and connecting the slow speed sweep generator for control of the encoding storage tubes, and an output means coupled with the encoding storage tube.

7. Pattern recognition apparatus comprising:

a multichannel optical cross-correlation sensor assembly, each sensor channel comprising an optical scanner, a photosensitive device, a document bearing patterns to be recognized interposed between the scanner and photosensitive device, a lens interposed between the document and the photosensitive device, a mask interposed between the document and the scanner, an amplifier responsive to the photosensitive device providing a first sensor channel output comprising a series of pulses representing maxima of the cross-correlation of the channel mask and document patterns of a matching class, said pulses including ambiguous indications of functions of cross-correlation of the channel mask and document patterns of a predetermined number of non-matching classes, an inverter responsive to the first sensor channel output for providing a second sensor channel output, each document in each channel being identical with all other documents and each mask being unique to an individual channel and uniquely corresponding to an individual class of patterns of the group to be recognized, and decision group selection circuitry responsive to the first and second sensor channel outputs for eliminating the ambiguous pulse indications and encoding the remaining pulses according to a class of patterns and the position within the document of a corresponding pattern.

8. Pattern recognition apparatus comprising:

a multichannel optical cross-correlation sensor assembly having a number of channels equal to the number of classes of patterns in a group of patterns to be recognized, each sensor channel comprising a flying spot scanner, a photosensitive device, a document bearing patterns to be recognized interposed between the scanner and photosensitive device, a lens interposed between the document and the photosensitive device, a mask interposed between the document and the scanner, an amplifier responsive to the photosensitive device providing a first sensor channel output, an inverter responsive to the first output for providing a second sensor channel output, each document in each channel being identical with all other documents and each mask being unique to an individual channel and uniquely corresponding to an individual class of patterns of the group to be recognized, horizontal and vertical sweep and blanking pulse generator circuits for synchronously controlling all said scanners, decision group selection circuitry responsive to the sensor channels and comprising an And gate for each channel, each gate having inputs from the first and second sensor channel outputs in the form of unique combinations of such outputs in accordance with a predetermined decision group program whereby the output of each gate corresponding to an individual class of patterns comprises only representations of such class, an encoding matrix including a plurality of Or gates having a programmed input from the And gates of the decision group selection to provide a digital coding of the And gate outputs, a multichannel output storage tape, a plurality of output And gates responsive to the encoding matrix Or gates for passing encoded signals to respective tape channels, a combining gate for combining signals from the decision group selection And gates, a clock pulse generator triggered from the output of the combining gate and providing a first enabling input to the output And gates, a first bistable device having a set and reset input synchronized with the vertical sweep of the flying spot scanners, a page change mechanism controlled by the first bistable device, the output And gates having a second enabling input from the bistable device, a second bistable device having a set input from the combining gate, a redundancy suppression And gate having an enabling input from the second bistable device and having a second input synchronized with the horizontal sweep of the flying spot scanners, and a counter and sequencing means having a counting input from the output of the redundancy suppression And gate and providing at a unique count thereof a third enabling input to the output And gates, said counter and sequencing means providing at a subsequent unique count thereof a resetting input to itself and to the second bistable device.

9. Apparatus for recognizing a pattern in a group of patterns comprising means for illuminating patterns of said group, a mask that matches a class of patterns of the group, means for transmitting light between said illuminated patterns and the mask to form a set of maxima of the cross correlations of the mask with each pattern of said class within the group, said maxima having a distribution corresponding to the spatial arrangement of patterns of said class, and means for identifying the maxima according to class and spatial position.

10. Apparatus for recognizing a pattern in a group of patterns comprising means for illuminating patterns of said group, a mask that matches a selected class of patterns of the group, and means for transmitting light between said illuminated patterns and said mask to form a set of cross-correlation maxima having a distribution corresponding to the spatial arrangement of patterns of the selected class.

11. Apparatus for recognizing a pattern in a group of patterns comprising means for illuminating patterns of said group, a plurality of masks that individually match selected classes of patterns of the group, means for transmitting light between said illuminated patterns and said masks to form sets of cross-correlation maxima, each set corresponding to a class and each maxima corresponding to a pattern of such class, each set having a distribution corresponding to the spatial arrangement of patterns of the class that matches the corresponding mask, some of the sets including a plurality of ambiguous indications of maxima, and means for eliminating said ambiguous indications from said last mentioned sets.

12. Apparatus for recognizing patterns in a group of patterns comprising means for illuminating patterns of said group, a plurality of masks that individually match classes of patterns of the group, and means for transmitting light between said illuminated patterns and said masks to form sets of maxima of the cross-correlation of each mask with each pattern of the class that matches such mask, the maxima of each set having a distribution corresponding to the spatial arrangement of patterns of the class corresponding to such maxima.

13. The apparatus of claim 12 including means for identifying each maxima of each set according to its corresponding class.

14. The apparatus of claim 12 including means for indicating said maxima by electrical signals and identifying the electrical signals according to the corresponding class of the maxima and spatial position of the corresponding patterns.

15. The apparatus of claim 12 wherein the means for transmitting light includes means for sequentially presenting masks to said patterns.

16. The apparatus of claim 12 wherein the means for transmitting light includes means for simultaneously presenting a number of masks to said patterns.

17. Apparatus for recognizing patterns in a group of patterns comprising means for illuminating a plurality of patterns of a group, a number of different masks that individually match a class of patterns of said group, means for transmitting light between said patterns and each of said masks to provide sets of cross-correlation maxima for each mask, each set including cross-correlation maxima of such mask and a corresponding pattern of its matching class.

18. Apparatus for recognizing patterns in a group of patterns comprising means for illuminating a plurality of patterns of a group, a number of different masks that individually match patterns of classes of patterns, means for transmitting light between said patterns and each of said masks to provide a cross-correlation maximum for each combination of a mask and matching pattern, means for providing an electrical indication of position and class identity of the resulting cross-correlation maxima for each combination of a mask and its matching patterns, and means for subtractively combining indications of predetermined decision groups of sets to eliminate from a given set ambiguous indications of all classes but one.

References Cited by the Examiner

UNITED STATES PATENTS

| | | | |
|---|---|---|---|
| 2,932,006 | 4/60 | Glauberman | 340—146.3 |
| 2,942,107 | 6/60 | Jensen | 328—165 |
| 2,968,718 | 1/61 | McKesson | 328—165 |
| 3,102,995 | 9/63 | Abbott | 340—146.3 |
| 3,144,554 | 8/64 | Whitney | 328—165 |

OTHER REFERENCES

"The Role of Optics in Applying Correlation Function to Pattern Recognition," by D. McLachlan, Jr., vol. 52, No. 4, pages 454–459, April 1962.

MALCOLM A. MORRISON, *Primary Examiner.*